United States Patent
Phillips et al.

(10) Patent No.: US 10,360,294 B2
(45) Date of Patent: Jul. 23, 2019

(54) METHODS AND SYSTEMS FOR EFFICIENT AND ACCURATE TEXT EXTRACTION FROM UNSTRUCTURED DOCUMENTS

(71) Applicant: Sciome, LLC, Research Triangle Park, NC (US)

(72) Inventors: Jason Phillips, Hillsville, VA (US); Ruchir Shah, Durham, NC (US); Brian Edward Howard, Raleigh, NC (US)

(73) Assignee: Sciome, LLC, Research Triangle Park, NC (US)

( * ) Notice: Subject to any disclaimer, the term of this patent is extended or adjusted under 35 U.S.C. 154(b) by 0 days.

(21) Appl. No.: 15/136,674

(22) Filed: Apr. 22, 2016

(65) Prior Publication Data
US 2016/0314104 A1    Oct. 27, 2016

Related U.S. Application Data

(60) Provisional application No. 62/152,916, filed on Apr. 26, 2015.

(51) Int. Cl.
*G06F 16/31*    (2019.01)
*G06F 17/22*    (2006.01)
(Continued)

(52) U.S. Cl.
CPC ........ *G06F 17/2294* (2013.01); *G06F 16/316* (2019.01); *G06F 16/3344* (2019.01);
(Continued)

(58) Field of Classification Search
CPC .................................................. G06F 17/2294
(Continued)

(56) References Cited

U.S. PATENT DOCUMENTS

| 6,336,124 B1* | 1/2002 | Alam ................. G06F 17/2229 |
| | | 707/E17.006 |
| 8,249,344 B2* | 8/2012 | Viola ................... G06F 17/271 |
| | | 382/173 |

(Continued)

OTHER PUBLICATIONS

Ramakrishnan, Cartic, Abhishek Patnia, Eduard Hovy, and Gully APC Burns. "Layout-aware text extraction from full-text PDF of scientific articles." Source code for biology and medicine 7, No. 1 (2012): 7.*

(Continued)

*Primary Examiner* — Frank D Mills
(74) *Attorney, Agent, or Firm* — Withrow & Terranova, PLLC

(57) ABSTRACT

According to one aspect, the subject matter described herein includes a method for extracting text from unstructured documents. The method includes creating a spatial index for storing information about words on a page of a document to be analyzed; using the spatial index to detect white space that indicates boundaries of columns within the page, aggregate words into lines, identify lines that are part of a header or footer of the page, and identify lines that are part of a table or a figures within the page; and joining lines together to generate continuous text flows. In one embodiment, the continuous text is divided into sections. In one embodiment, references within the document are identified. In one embodiment, inline citations within the document body are replaced with the corresponding reference information, or portions thereof.

25 Claims, 34 Drawing Sheets

(51) Int. Cl.
  *G06F 16/35* (2019.01)
  *G06F 16/38* (2019.01)
  *G06F 16/33* (2019.01)
  *G06F 16/955* (2019.01)
  *G06K 9/00* (2006.01)

(52) U.S. Cl.
  CPC .......... *G06F 16/353* (2019.01); *G06F 16/382* (2019.01); *G06F 16/9558* (2019.01); *G06F 17/2264* (2013.01); *G06K 9/00463* (2013.01)

(58) Field of Classification Search
  USPC .......................................................... 715/244
  See application file for complete search history.

(56) References Cited

U.S. PATENT DOCUMENTS

| | | | | |
|---|---|---|---|---|
| 8,249,356 | B1* | 8/2012 | Smith | G06K 9/00463 382/182 |
| 8,379,053 | B1* | 2/2013 | Phillips | G06Q 30/02 345/619 |
| 2001/0043741 | A1* | 11/2001 | Mahoney | G06K 9/00463 382/199 |
| 2004/0006742 | A1* | 1/2004 | Slocombe | G06F 17/2205 715/234 |
| 2006/0195458 | A1* | 8/2006 | Buerer | G06F 17/30241 |
| 2007/0009161 | A1* | 1/2007 | Hollingsworth | G06K 9/00442 382/229 |
| 2009/0030671 | A1* | 1/2009 | Kwon | G06F 17/211 704/2 |
| 2009/0046918 | A1* | 2/2009 | Dejean | G06K 9/2054 382/135 |
| 2009/0228442 | A1* | 9/2009 | Adams | G06F 17/30864 |
| 2010/0005060 | A1* | 1/2010 | Shebanow | G06F 17/30 707/E17.108 |
| 2011/0055285 | A1* | 3/2011 | Chenthamarakshan | G06F 17/30864 707/803 |
| 2011/0307435 | A1* | 12/2011 | Overell | G06F 17/278 706/46 |
| 2012/0005225 | A1* | 1/2012 | Chidlovskii | G06F 17/30643 707/769 |
| 2012/0185511 | A1* | 7/2012 | Mansfield | G06F 17/218 707/792 |
| 2013/0191732 | A1* | 7/2013 | Lazarevic | G06K 9/00463 715/249 |
| 2014/0245122 | A1* | 8/2014 | Oro | G06F 17/2785 715/230 |
| 2014/0281939 | A1* | 9/2014 | Agrawal | G06F 17/21 715/256 |
| 2014/0301644 | A1* | 10/2014 | Koh | G06K 9/00469 382/175 |
| 2016/0085727 | A1* | 3/2016 | Bruno | G06F 17/2235 715/234 |
| 2016/0140145 | A1* | 5/2016 | Bruno | G06F 17/212 715/201 |
| 2016/0292296 | A1* | 10/2016 | Murphy | G06F 17/30911 |

OTHER PUBLICATIONS

Breuel, Thomas M. "The OCRopus open source OCR system." In Document Recognition and Retrieval XV, vol. 6815, International Society for Optics and Photonics, 2008, p. 1-15 (Year: 2008).*

Smith, R. W. (Jul. 2009). Hybrid Page Layout Analysis via Tab-Stop Detection. In Document Analysis and Recognition, 2009. ICDAR'09. 10th International Conference on (pp. 241-245). IEEE. (Year: 2009).*

Breuel, Thomas M. "Two geometric algorithms for layout analysis." In International workshop on document analysis systems, pp. 188-199. Springer, Berlin, Heidelberg, 2002. (Year: 2002).*

* cited by examiner

METHODS AND SYSTEMS FOR EFFICIENT AND ACCURATE TEXT EXTRACTION FROM UNSTRUCTURED DOCUMENTS

RELATED APPLICATIONS

This application claims the benefit of provisional patent application Ser. No. 62/152,916, filed Apr. 26, 2015, the disclosure of which is hereby incorporated herein by reference in its entirety.

TECHNICAL FIELD

This disclosure relates to techniques that may be used to extract text contained within unstructured documents in a manner that accurately reconstructs the original content and text flows. More specifically, it relates to methods and systems for efficient and accurate text extraction from unstructured documents.

BACKGROUND

The portable document format (PDF) is a file format used to present documents in a manner independent of application software, hardware, and operating systems. Each PDF file encapsulates a complete description of a fixed-layout flat document, including the text, fonts, graphics, and other information needed to display it. Released as an open and royalty-free standard in 2008, it has become a de-facto format for publication of documents intended for global distribution, such as scientific, technical, and scholarly papers, in large part because storing articles in the PDF format provides a uniform way to view and print data.

PDF is based on PostScript, which is a page description language that is used to generate text layout and graphics. Like PostScript, PDF can describe page elements in any arbitrary order—i.e., not necessarily in the "left to right, top to bottom" order in which many languages are read. As a result, while PDF documents visually display text flow readable by humans, the stored text objects within the PDF file are not ordered, which is to say that they are not necessarily described in the order that the objects will be read by the reader, a characteristic that is herein referred to as "unordered". PDF files, PostScript files, and other PDL file formats, to name a few, are "unordered" text files. This creates a challenge for systems to automatically extract the data for use in analyses such as text-mining. Scientific articles, for example, are often presented in a multi-column format, which poses even more challenges to correctly order the text. Tables, figures, and inline citations are also features of scientific and other documents. These features may disrupt the flow of the main body of text, which raises even more challenges.

This need is particularly felt in the scientific and technical communities, especially in cases where research is conducted based on a thorough review of a large body of existing literature. A person doing research, for example, may have access to online libraries that contain large numbers of reports, documents, and papers in PDF format. In this scenario, a simple word search—i.e., a search that returns documents containing a particular word—is relatively easy to do: the tool need only determine whether the document contains the word or does not contain the word. Such a search has very limited utility, especially if the word or phrase being sought includes common words.

However, more valuable would be the ability to find words that exist in a particular context. For example, it may be desirable to search for words that occur next to (or near to) each other in a sentence. This kind of search requires that the tool not only extract the text but also assemble it into a text flow that reproduces the original text. In other words, the tool should not only extract words but be able to stitch words back in its original intended order to create sentences and sentences ordered as intended paragraphs of text. This requires a tool that can handle multi-column layout and that does not get confused by embedded tables and figures.

Since scholarly papers most often conform to a particular structure, for example having an abstract, a description of the problem, a description of the methods used, a description of the results, a bibliography, and so on, these documents are said to have distinct "sections". From a text extraction perspective, it would be tremendously more valuable to be able to find words that exist inside or outside of a particular 'section'. In order to do this, however, not only must the text content of the unstructured document be properly reassembled into text flows (or else the sections are incorrectly assembled) but the tool must also have the capability to analyze a properly reordered text flow to identify the sections contained within and be able to categorize the words according to its sections.

Documents of scholarly articles typically include a bibliography section that lists references, usually located at the end of the document. The text within such articles often includes inline references to an entry in the bibliography. A reader who wants to pay particular attention to the source of a particular fact set forth in a scholarly work may find himself or herself flipping back and forth between the current location in the text and the bibliography information at the back of the document, which is time consuming, can be irritating, and provides opportunities for human error in which the reader erroneously attributes a piece of information to the wrong source. Thus, yet another valuable feature would be a tool that can replace inline bibliographic references with the actual bibliographic information or a subset thereof. In order to do this, however, the tool would need to (i) properly reassemble text flows, (ii) correctly identify sections, such as the Bibliography, and (iii) use that information to replace inline citations with bibliographic information in rest of the document.

There is a need for methods and systems that can accurately and efficiently reconstruct text flows for simple to complex, multi-column page layouts. There is a need for methods and systems that can additionally sectionalize the documents and categorize words by section. There is also a need for methods and systems that can additionally use section information to perform section-specific operations, such as the substitution of inline references to bibliographic information with the bibliographic data itself. More specifically, there is a need for methods and systems for efficient and accurate text extraction from unstructured documents.

SUMMARY

The subject matter described herein addresses each of the problems posed by various obstacles in text flow by using a novel method to store words in a spatial index allowing for efficient querying of word locations based on points of interest. Such a method allows for accurate column detection, both in multi-column articles and tables. For example, the spatial index can be used to efficiently and accurately detect white space that indicates column boundaries or borders. This method also allows efficient querying of the position of a word or a logical group of words (e.g., a line, a paragraph, a table row, a table column, etc.) with regard to other text objects in order to make intelligent decisions about text flow. Accurately extracting text from unstructured documents greatly increases the usefulness of output when analyzing the information with text mining, NLP, and other text analytic methods.

Methods, systems, and computer program products for extracting text from unstructured documents are herein provided.

According to one aspect, the subject matter described herein includes a method for extracting text from unstructured documents. In one embodiment, the method includes creating a spatial index for storing information about words on a page of a document to be analyzed; using the spatial index to detect the locations of white space that indicates column boundaries, column borders, or column separators within the page, aggregate words into lines, identify lines that are part of a header or footer of the page, and identify lines that are part of a table or a figures within the page; and joining lines together to generate continuous text flows. In one embodiment, the continuous text is divided into sections. In one embodiment, references within the document are identified. In one embodiment, inline citations within the document body are replaced with the corresponding reference information, or portions thereof.

According to another aspect, the subject matter described herein includes a system for efficient and accurate text extraction from unstructured documents. In one embodiment, the system includes a document parser module for parsing an unstructured document and, for each page within the document, identifying words and their locations within the page and storing the identified words and their locations into a spatial index; and an analysis module for using the spatial index to detect the locations of white space that indicates column boundaries or borders within the page, aggregating words into lines, identifying and lines that are part of a header or a footer of the page, identifying lines that are part of a table or a figure within the page, and joining lines together to generate continuous text flows. In one embodiment, the analysis module divides the continuous text into sections. In one embodiment, the analysis module identifies references within the document. In one embodiment, the analysis module replaces inline citations within the document body with the corresponding reference information, or portions thereof.

The subject matter described herein for efficient and accurate text extraction from unstructured documents may be implemented in hardware, software, firmware, or any combination thereof. As such, the terms "function" or "module" as used herein refer to hardware, software, and/or firmware for implementing the feature being described.

In one exemplary implementation, the subject matter described herein may be implemented using a computer readable medium having stored thereon executable instructions that when executed by the processor of a computer control the computer to perform steps. Exemplary computer readable media suitable for implementing the subject matter described herein include disk memory devices, chip memory devices, programmable logic devices, application specific integrated circuits, and other non-transitory storage media. In one implementation, the computer readable medium may include a memory accessible by a processor of a computer or other like device. The memory may include instructions executable by the processor for implementing any of the methods described herein. In addition, a computer readable medium that implements the subject matter described herein may be located on a single device or computing platform or may be distributed across multiple physical devices and/or computing platforms.

BRIEF DESCRIPTION OF THE DRAWINGS

Embodiments of the subject matter described herein will now be explained with reference to the accompanying drawings, wherein the like reference numerals represent like parts, of which.

DETAILED DESCRIPTION

Figure 1:
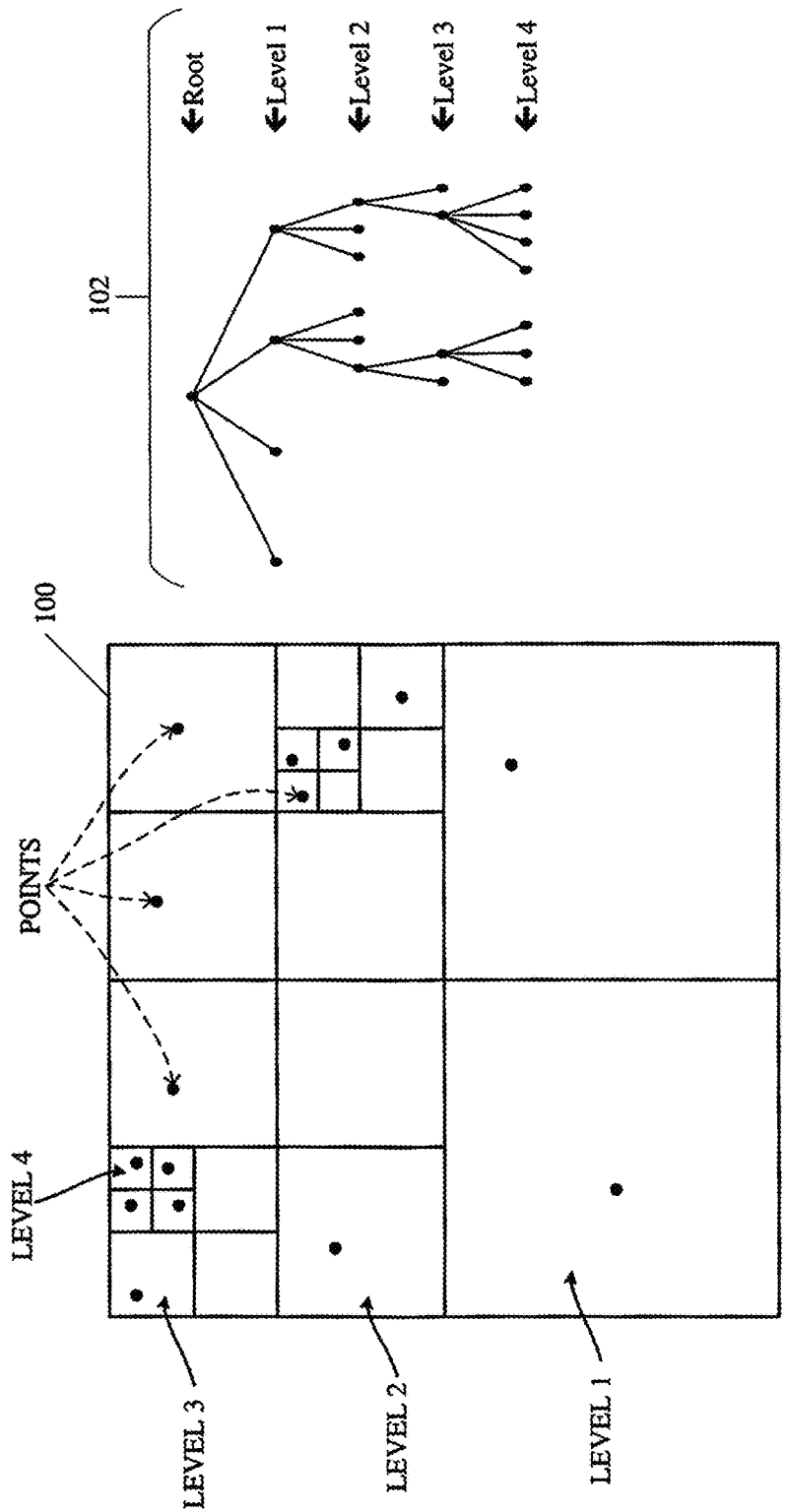
FIG. 1 illustrates an example of one type of spatial index, called a Quad Tree, that shows how points are stored inside of a spatial object.

Methods and systems for intelligent extraction of data from articles that are stored in documents are disclosed. Words within a document are identified and their rectangular coordinates are determined. The words are then stored in a spatial index data structure, which enables efficient querying of the words' spatial position; this allows the system to generate correct text flow and extract meaningful data from the document very efficiently. Ordered textual data and structured text may be produced as output, which enables exploring various aspects of the documents' content, through, for example, various text-mining approaches.

These subject matter described herein illustrates how the application of a technology originally created for analysis of real-world, graphical coordinates—spatial indexing—has been applied in a novel manner to address a need in an unrelated discipline—text processing—to address a need that has existed since the days of the printing press: i.e., the need to intelligently and efficiently reconstruct information from a collection of disconnected and independent fragments of text having no inherent means to indicate association with each other. This is accomplished by taking advantage of the position information contained in unstructured text file formats. Although other, brute force methods of text reconstruction have been proposed, none use spatial indexing. The application of spatial indexing to text reconstruction creates a synergy that results in a dramatic increase in performance over conventional approaches.

The systems and methods described herein are particularly suited for extraction of data from PDF documents, but the same concepts may be applied to other types of documents, including those that contain unstructured text objects or graphics. Examples include, but are not limited to, print definition language (PDL) files, PostScript™ files, and other files for which text coordinates may be determined. The systems and methods disclosed herein may be applied to images as well, including, but not limited to portable network graphics (PNG) files, tagged image file format (TIFF) files, joint photographic experts group (JPEG) files, and other image formats that may be used to represent pages containing words having specific locations within a two-dimensional plane.

Regardless of the original format of the document, the subject matter described herein creates a list of words and their rectangular coordinates. Spatial indexing is used to identify text flow. The reconstructed text flow can then be divided into sections. The use of spatial indexing substantially increases the efficiency and accuracy of content extraction, especially in documents having multiple columns, multiple sections, embedded tables and figures, and other features found in spatially complex page layouts.

Spatial Indexing.

Spatial indexing provides a means to index objects based on their positions in space and store them in a data structure providing an efficient means of querying. There may be any number of spatial objects. In the field of geographic information systems, or GIS, objects on a map are stored in spatial objects. There could be millions of objects of interest. To calculate how a particular point in that space relates to all of the other objects (finding the nearest object, intersecting objects, or finding objects within a certain distance) iteratively asking each of the millions of objects how they relate to the particular point of interest is enormously inefficient and potentially very time consuming. Hence there is a need to store the objects in a structure that stores this information efficiently, that may be quickly queried, and that produces accurate results.

Examples of spatial index structures include, but are not limited to, R-Tree and Quad-Tree. R-Tree is similar to B-Tree and Quad-Tree is similar to a Binary Tree in terms of relating them to common data structures used to store non-spatial objects (like strings, integers, etc.). The tree structures are important to understanding the advantages of querying the objects stored. Other examples include, but are not limited to, a grid, a Z-order index, an octree, a UB-tree, an R* tree, a Hilbert R-tree, an X-tree, a kd-tree, an m-tree, a point access method tree, a binary space portioning tree, or other spatial index type.

The spatially indexed object takes up space that is contained within a bounding rectangle. Each object is contained within a larger rectangle called a parent rectangle, and is thus said to be a child of the parent rectangle. Parent rectangles can contain one or more children.

FIG. 1 is a graphical representation of a Quad Tree that shows how points are stored inside of a spatial object 100. The tree structure 102 to the right represents the traversals a query will have to follow to arrive at the point during a query to reach the children.

Given an object with spatial coordinates, the spatial index is queried and finds the first parent rectangle for intersection. In the figure above, each of the Level 1 nodes are queried to determine whether its rectangle contains the point in question. Once that Level 1 node is identified, the query looks at the children of the parent rectangle (i.e., the Level 2 nodes under the identified Level 1 node) to see which Level 2 rectangle contains the object. This process continues until a leaf node (i.e., a node without children) is found. The leaf node's rectangle is the one that intersects or is the nearest to the object in the query.

Figure 2:
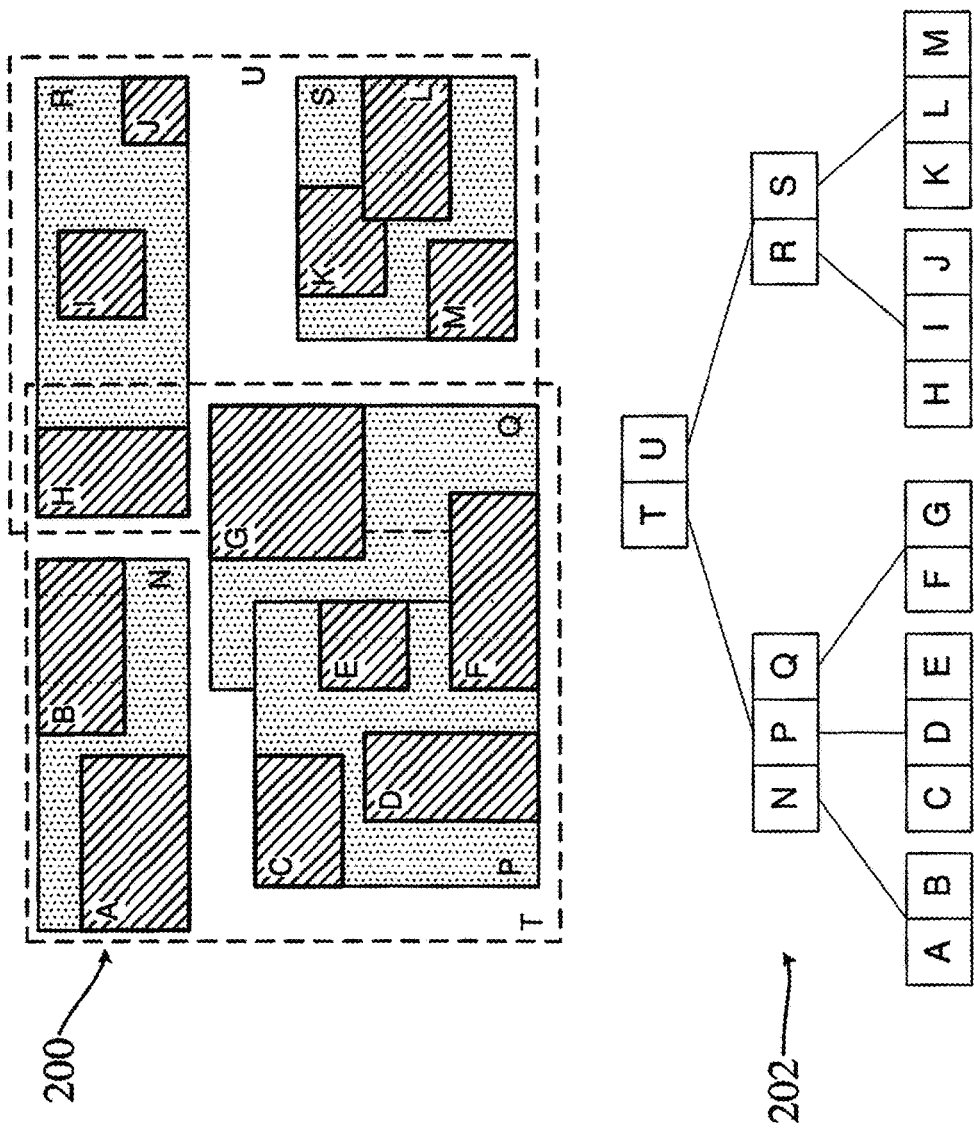
FIG. 2 illustrates an example of another type of spatial index, called an R-Tree, which can divide an area into rectangles of any arbitrary size and location.

FIG. 2 illustrates an R-Tree, which is another spatial index that can divide an area 200 into rectangles of any arbitrary size and location. The children are labeled as A-M, the parents of the children are labeled N-S, and the grandparents are labeled T and U. The corresponding R-Tree structure 202 shows that, in this example, a maximum of two traversals are needed to find the intersecting object. For instance, if a point lies in rectangle T, it doesn't have to care about U and its children/grand children. Then if the point lies in P it doesn't have to care about N and Q's children. For an R-Tree, the size of the parent rectangle is typically only as large as is needed to contain all of its children. When a child is added to a parent rectangle, the parent rectangle may be enlarged as needed to contain the additional child. A parent rectangle may be a child of an even larger rectangle, and so on. As can be seen in the example above, object E is a child of P, but it could also have been a child of Q; the R-Tree algorithm generally associate E with whichever parent creates a more balanced tree. Likewise, it can be seen that rectangles may overlap, as do parents P and Q in the figure above. It is possible to create parent rectangles in a way that guarantee that none of them overlap, but this is more computationally expensive and usually not necessary.

The subject matter described herein uses spatial indexing to store words on a page, along with each word's bounding rectangle. By storing words on a page in such a data structure, it becomes inexpensive to issue queries to the index as opposed to having no index at all. The subject matter described herein takes advantage of the efficiencies provided by the spatial index by indexing the words on a page using a R-Tree structure (although other structures may also be used.)

During the column separator detection process, for example, the tool issues many queries by asking if a particular point lies within a word rectangle. The tool may query the index for the nearest word in order to make decisions whether or not the point of interest is indeed part of the white space between columns. By finding sufficiently long vertical lines of white space, the tool can then define the column separators which enable the rest of the pipeline to function properly.

By storing the text objects (e.g., words) and their rectangular coordinates in a spatial index, the subject matter described herein is able to efficiently query the position of words in relation to other words within the document to correctly identify white space that indicates column boundaries or borders between bodies of text in multi-column documents as well as column separators within tables. By so identifying columns throughout the document allows the tool to accurately generate correct text flow, extract figures and tables, assign bodies of text to their respective section (a process herein referred to as "sectionalization"), extract individual references, detect inline references and relate the extracted references to the inline references.

Spatial indexing provides distinct benefits over methods currently used in the prior art. Examples of spatial indices include, but are not limited to, R-Tree, R+-tree, Quad-Tree, Oct-Tree and others. Spatial indexing may be any implementation that provides the capability of querying a spatially indexed objects' position relative to other spatial objects. The spatial index offers an efficient mechanism to search for objects of interest. This is a clear advantage over iterating through all objects to find the objects of interest.

The use of a spatial index by the systems and methods described herein provide the ability to efficiently find the nearest text object to the supplied input or find which text object is intersected by the supplied input, to give just two examples. In one embodiment, the supplied input is a rectangle. The spatial index allows this type of query to be performed in approximately $O(m*\log(n))$ where m is the number of queries and n is the number of text objects indexed. In contrast, a sequential query would be performed in approximately $O(m*n)$. As the number of m's and n's grow, the sequential query becomes undesirable due to inefficient runtime.

Glossary of terms. As used herein, the following terms will have the particular meanings listed below:

Column separator: A rectangular region between columns of text that does not intersect words on the page.

Word: Text and its rectangular box represented on a page.

Line: Aggregated words, the text, and the rectangular box represented on a page.

Sectionalization: The process of assigning text to a "section". This is useful in scientific documents where various sections add meaning to text assigned to said section.

Inline reference (inline citation): The reference found in the main body of text.

Bucket: A temporary storage mechanism containing line(s) of continuous text flow.

Spatial Index: A data structure to store an object and the objects position in space, such as on a 2-D plane representing a page in a document. Spatial indexing enables efficient querying of text objects in relation to other text objects or points of interest on a page.

List: A collection of items. The collection may be stored in a list, array, table, tree structure, database, or in any other data storage means. Lists may be sorted or unsorted, indexed or non-indexed, randomly or sequentially accessed, etc.

Figure 3:
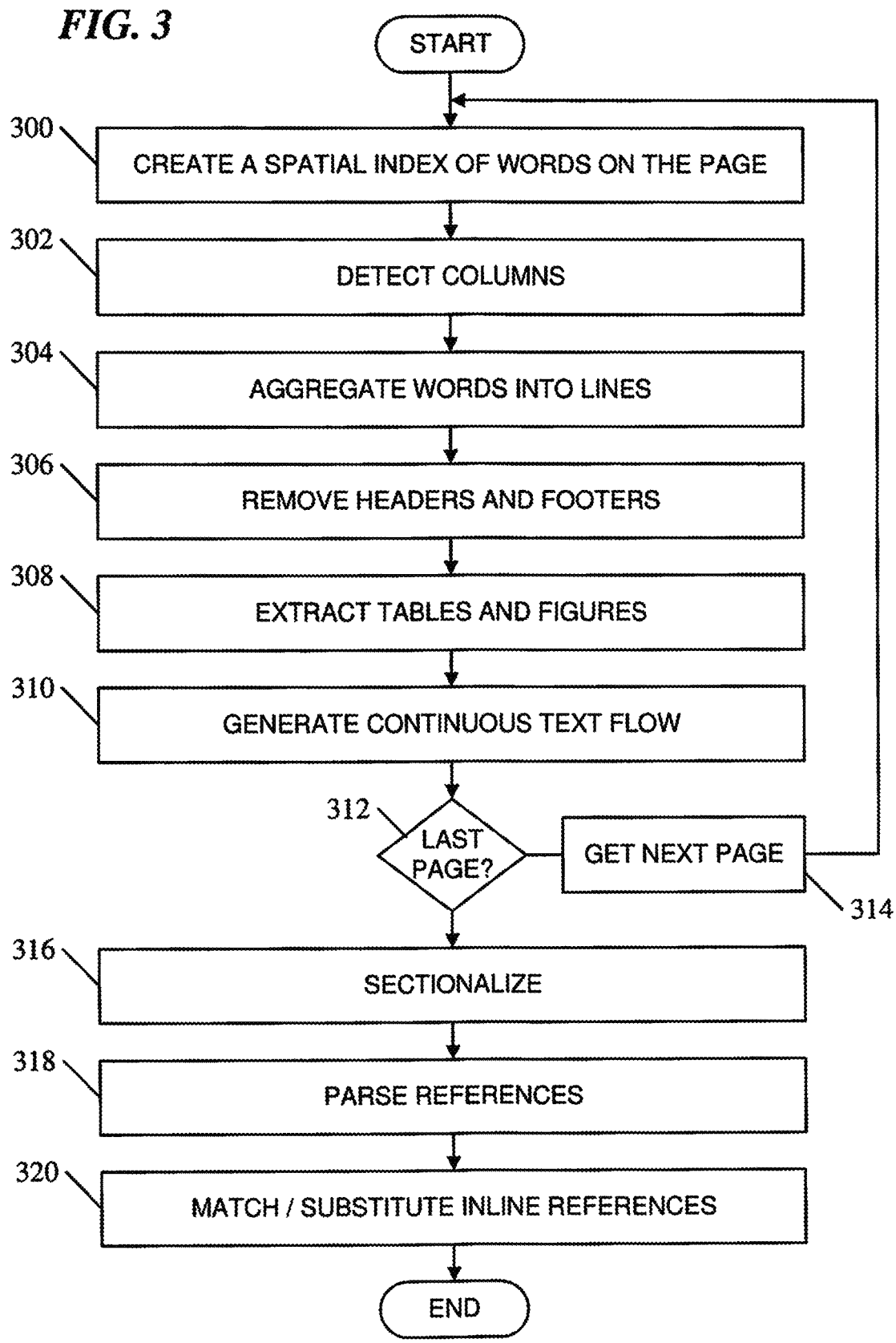
FIG. 3 is a flow chart illustrating an exemplary process for efficient and accurate text extraction from unstructured documents according to an embodiment of the subject matter described herein.

FIG. 3 is a flow chart illustrating an exemplary process for efficient and accurate text extraction from unstructured documents according to an embodiment of the subject matter described herein. In the embodiment illustrated in FIG. 3, the process includes creating a spatial index of words on a page (step 300). The spatial index is used to detect columns (step 302), aggregate words into lines (step 304), remove headers and footers (step 306), extract tables and figures (step 308), and generate continuous text flow (step 310). At step 312, the process checks for more pages, e.g., by checking to see if the page just processed is the last page. If not, the process goes to the next page (step 314), which is processed in the same manner starting with step 300. If, at step 312, all pages have been processed, then the continuous text is sectionalized (step 316), references are parsed (step 318), and inline references are matched (step 320), which may also include performing inline substitution of some or all of the reference information into the main text. Each of these steps will now be described in more detail below using additional figures as visual reference.

Figure 4:
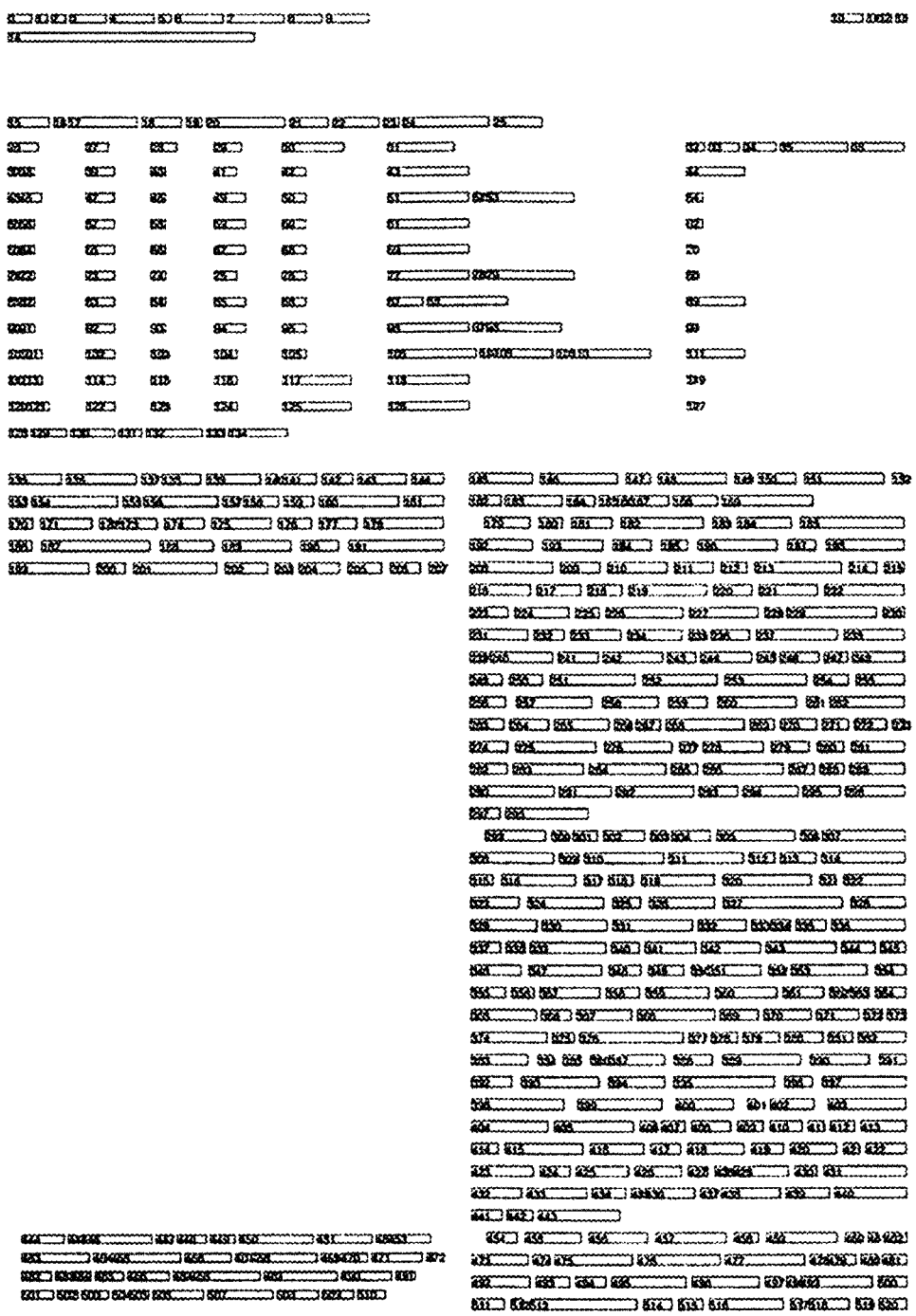
FIG. 4 illustrates a sample page of a document showing the rectangular bounding boxes that indicate the positions for all of the text objects that were found on that page according to systems and methods described herein.

FIG. 4 illustrates a sample page of a document showing the rectangular bounding boxes that indicate the positions for all of the text objects that were found on that page according to systems and methods described herein. In this example, the bounding boxes are numbered in order according to their positions on the page from left to right and top to bottom within the document—which in this example was a PDF file—starting with 0 and ending with 593, meaning that 594 text objects were found in this example page. Each text object contains a group of characters that may include letters, numbers, punctuation, or some combination. The text object may be word, a portion of a word (e.g., when a long word is split across lines using a hyphen), a number, a portion of a number, or some combination, including strings of characters that form a logical group that is not technically an actual word or number, such as a user ID, a serial number or model number, a password, and so on. For simplicity of description, however, the term "word" will be used hereinafter as a synonym for "text object".

In one embodiment, the starting point of the workflow is a list of pages, usually in the order presented within the document. Each page contains a list of words ordered by their position on the page from left to right and top to bottom, such as shown in FIG. 4. Each word's rectangular coordinates may also be part of the word object. Thus, for each page of the document, there is a unique ordered word list. (It is also assumed that this list is accurate; detection and correction of errors caused by optical character recognition (OCR) of images is beyond the scope of this description, but such techniques may also be used in tandem with the techniques described herein.} Such a list can be generated by using a PDF Parser library which returns a list pages each with a list of words and their coordinates.

Storing the pages, words, lines or any other object in useful data structures provides a means to allow iterations to occur in a way that benefits the algorithms used. For example, in one embodiment, each page of the document may be stored as an object in a list, where the first list entry represents the first page, the second list entry represents the second page, and so on. In these or other embodiment, other objects (such as words, lines, column separators, figure bounding rectangles, table bounding rectangles) may be stored individually as sub lists of a given page. For example, in one embodiment each page object may contain a list of words, a list of rectangles that define column separators, and other data or metadata that describes or is otherwise pertinent to that page.

Spatial Index Creation.

In one embodiment, each page may have associated with it its own spatial index of objects found on that page. Example objects that may be spatially indexed include, but are not limited to, words, lines, tables, columns, column boundaries, headers, footers, or other visual features of the page, as well as groups thereof. As will be described in more detail below, there are distinct advantages to using spatial indices to store page objects, since a page is represented as a 2-dimensional play with an X-Y coordinate system. In one embodiment, document processing involves iteration through the document page by page, processing the objects found on each page. Other embodiments are also contemplated, however. For example, page layouts that include hints for stitching together columns of text that span multiple pages (e.g., print newspapers that continue a story on a later page) may be processed by iterating through identified threads rather than iterating through identified pages. Other approaches to iteration are possible.

In one embodiment, the spatial index is created by iterating through the list of words (in the example illustrated in FIG. 4, from word 0 through word 593) and adding each word to the spatial index for that page. Each entry in the spatial index may include coordinates that represent a rectangular position within a two-dimensional plane. It is assumed that these coordinates accurately represent how a user would view the words on the page. Once the spatial index is constructed, it may be used for column detection.

Column Detection.

Figure 5:
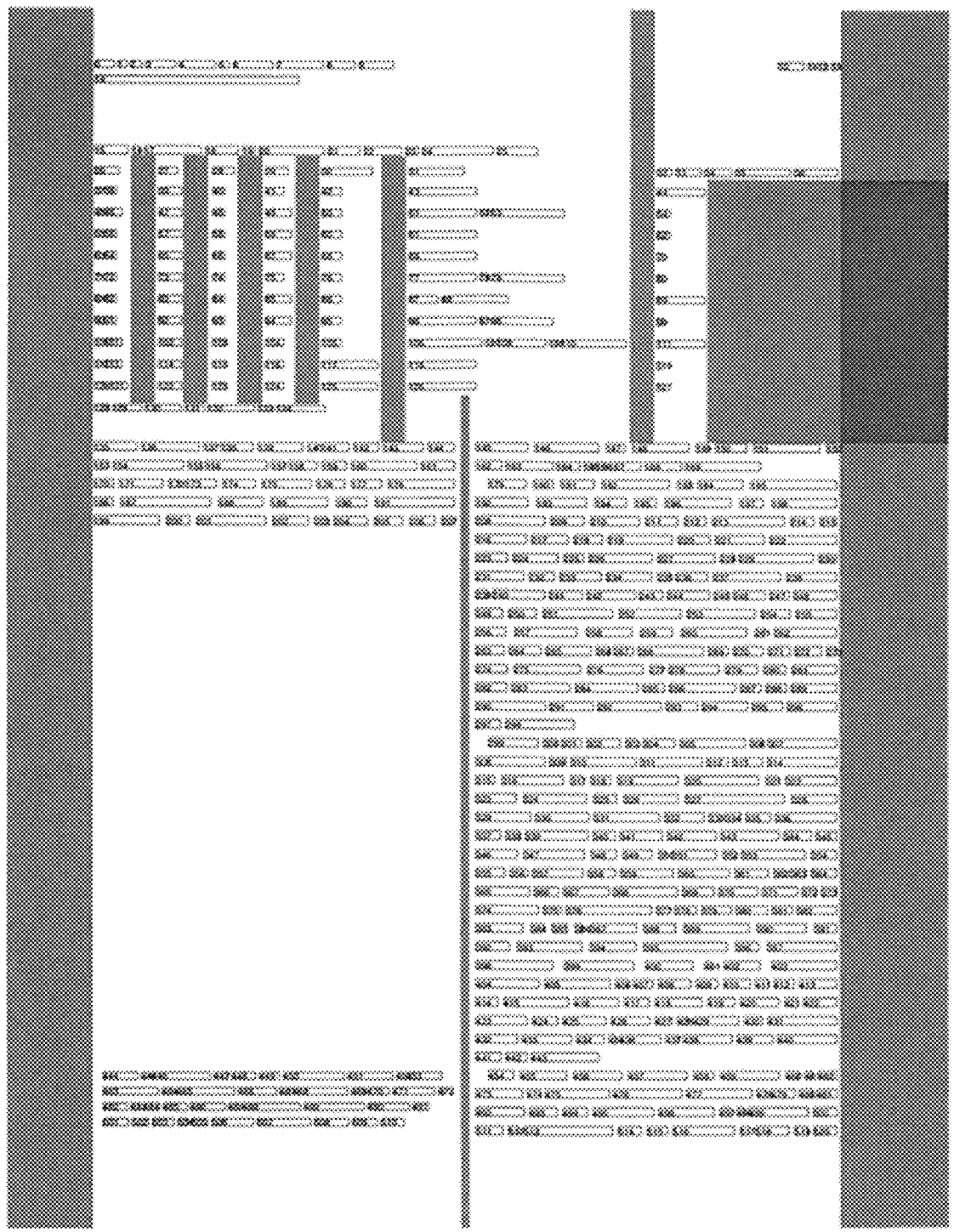
FIG. 5 illustrates a sample page of a document showing the results of column detection performed according to systems and methods described herein.

FIG. 5 illustrates a sample page of a document showing the results of column detection performed according to systems and methods described herein. The white rectangles represent the locations of text objects with the page, and the shaded rectangles indicate where column boundaries were detected using the spatial index.

In one embodiment, column or column boundary detection includes iterating through the list of pages. For each page, the spatial index for that page is retrieved. With the spatial index in place, each page is analyzed by a column detection mechanism. In one embodiment, the page is viewed as a matrix of two-dimensional points. The current invention iterates through each column of the matrix in search of regions that may operate as column separators. For example, the algorithm may start at the top left corner of the page, which has the X-Y coordinates (0,0). If no word is located at point (0,0), the algorithm identifies this as the top of a potential column, and moves down the page towards the bottom left corner of the page, which is point (0,900) in this example. The next traversal may begin at point (10, 0) and end at (10, 900). Each column of points is visited until all of the columns in the matrix have been visited.

The spatial index greatly improves the speed and accuracy with which the system can determine whether a given point is located within a word or not. Conventional systems that do not use the spatial index must iterate though lists of words one by one to determine whether the next word in the list contains the X,Y coordinate of interest. The use of spatial indexing obviates this need to iterate through every word in the list to make this determination.

While traversing the column in the matrix, the current invention uses the points in the column to query the spatial index in search of contiguous vertical white space. White space is defined as a point with significant surrounding space that does not intersect a word on the given page. The current invention stores contiguous lines of white space as separators between columns of text, whether it be in a multi-column document or a table in a document. These contiguous regions of white space (column separators) are then post-processed to form the final column separators. The post-process functionality includes merging and elongating column separators to be optimal for the purposes of other steps in the current invention. In the example page illustrated in FIG. 5, the shaded (e.g., grey-filled) rectangles indicate the column separators found by this method.

Word/Line Aggregation.

Figure 6:
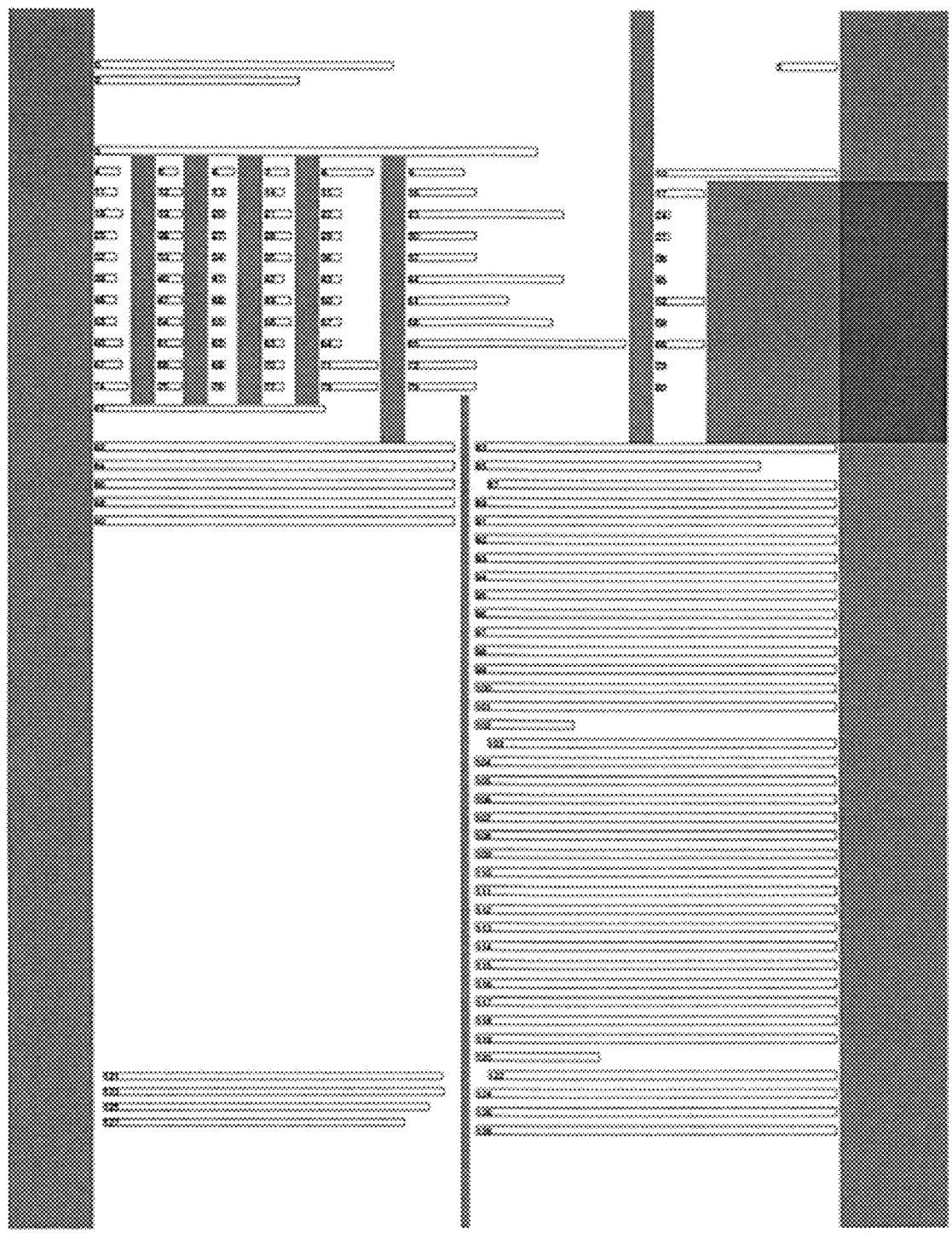
FIG. 6 illustrates the sample page of FIG. 5 showing the results of word and line aggregation according to the systems and methods described herein.

FIG. 6 illustrates the sample page of FIG. 5 showing the results of word and line aggregation according to the systems and methods described herein. In FIG. 6, sequences of words arranged horizontally have been identified as belonging to the same line. The white-filled rectangles displayed in FIG. 6 represent identified lines of text, and are numbered from 0 to 128. Thus, in the example page illustrated in FIG. 6, 129 lines were identified.

Aggregating words into lines is feasible after the column boundaries have been established. In one embodiment, by iterating through each word, words can be concatenated into lines by using the column boundaries as a signal for ending aggregation for words that are horizontally adjacent. This process disallows lines that span multiple column boundaries. After a line is created, the word rectangles and coordinates are combined to create and assign a rectangular coordinate for the line. In one embodiment, the lines for each page are sorted from left to right and up to down to aid future line traversals and methods further down the pipeline. The information about lines found may be stored in a separate list, which is also associated with the corresponding page object. In one embodiment, the lines are also stored in a spatial index in the same method as the words are for efficient querying of spatial information.

Header/Footer Removal.

Figure 7:
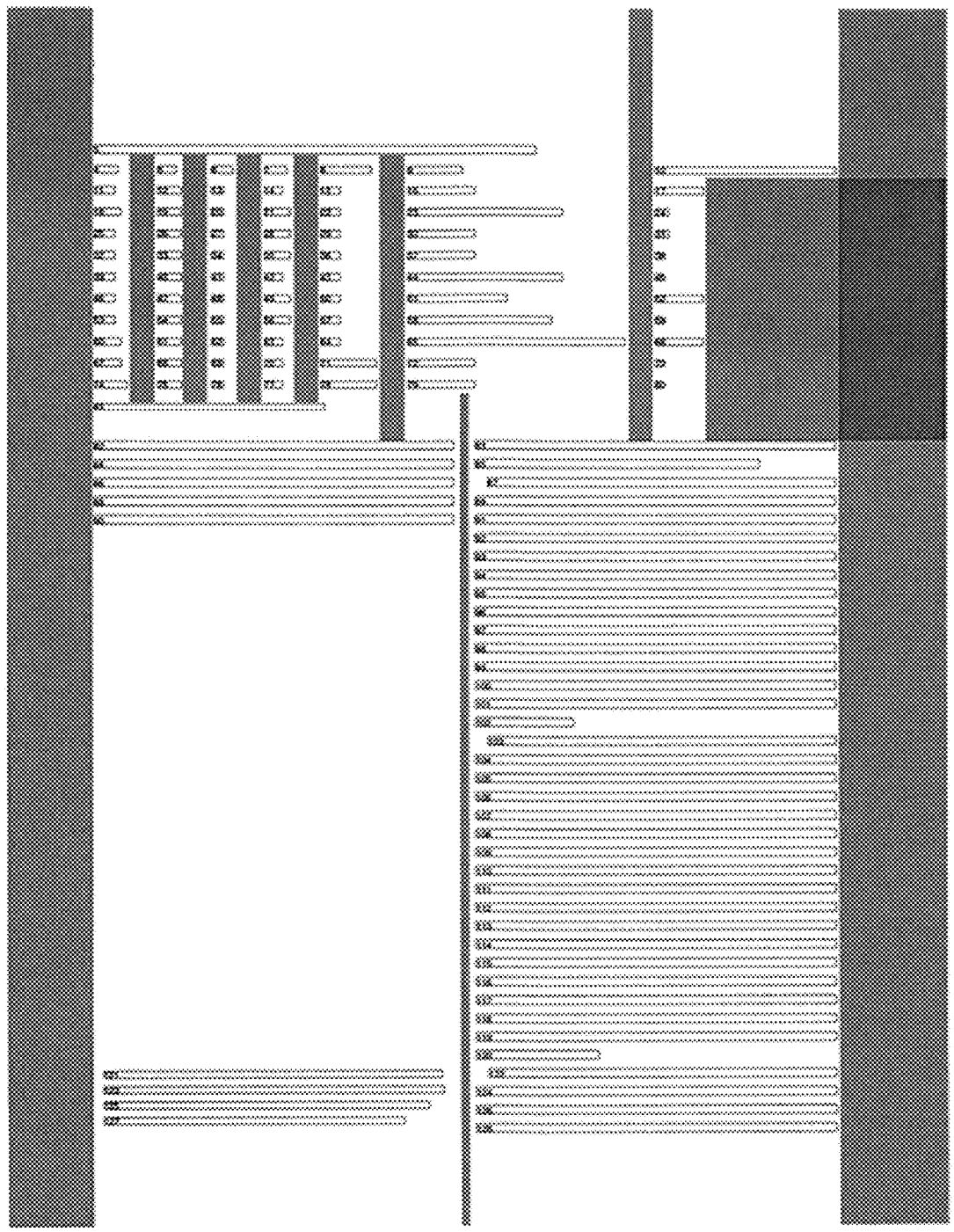
FIG. 7 illustrates the sample page of FIG. 6 showing the results of header and footer removal according to the systems and methods described herein.

FIG. 7 illustrates the sample page of FIG. 6 showing the results of header and footer removal according to the systems and methods described herein. Headers and footers in documents can disrupt text flow when transitioning between pages. This process inspects the top and bottom rectangular regions of a page to determine if the lines in those regions are part of the main text flow. If lines are found in the regions that can be labeled as header of footer, then that line is removed from the list of lines on the given page. In FIG. 7, for example, lines 0, 1, and 2 have been identified as being part of a header and are removed from consideration.

Because identification of headers and footers may require analysis of multiple pages, e.g., to identify repeating text, such as author name, article or publication name, page number markers, and the like, header and footer removal may carried out across all pages of the document prior to the following steps such as table extraction, etc., or it may be performed on a page by page basis as shown in the flowchart in FIG. 1.

In one embodiment, header and footer removal includes looping through each page, and for each page, inspecting a rectangle at the top of the page's 2D plane. The spatial index is used to return lines that fall within that rectangle. If the exact position of the header is known, lines within that known rectangle may be discarded or otherwise exempt from being included in the text flows generated in subsequent steps. If the exact position of the header is not known, the lines returned by the spatial index may be further analyzed to look for telltale indicators that they are part of a header, such as containing a known string (e.g., document title, author name, date, etc.) or containing a string that shows up at the top of other pages. Any lines so identified may be discarded or otherwise excluded from the text flows. The same concepts may be applied to identify and remove footers. In this operation also, spatial indexing provides significant increases in efficiency over conventional methods.

Table/Figure Extraction.

Figure 8:
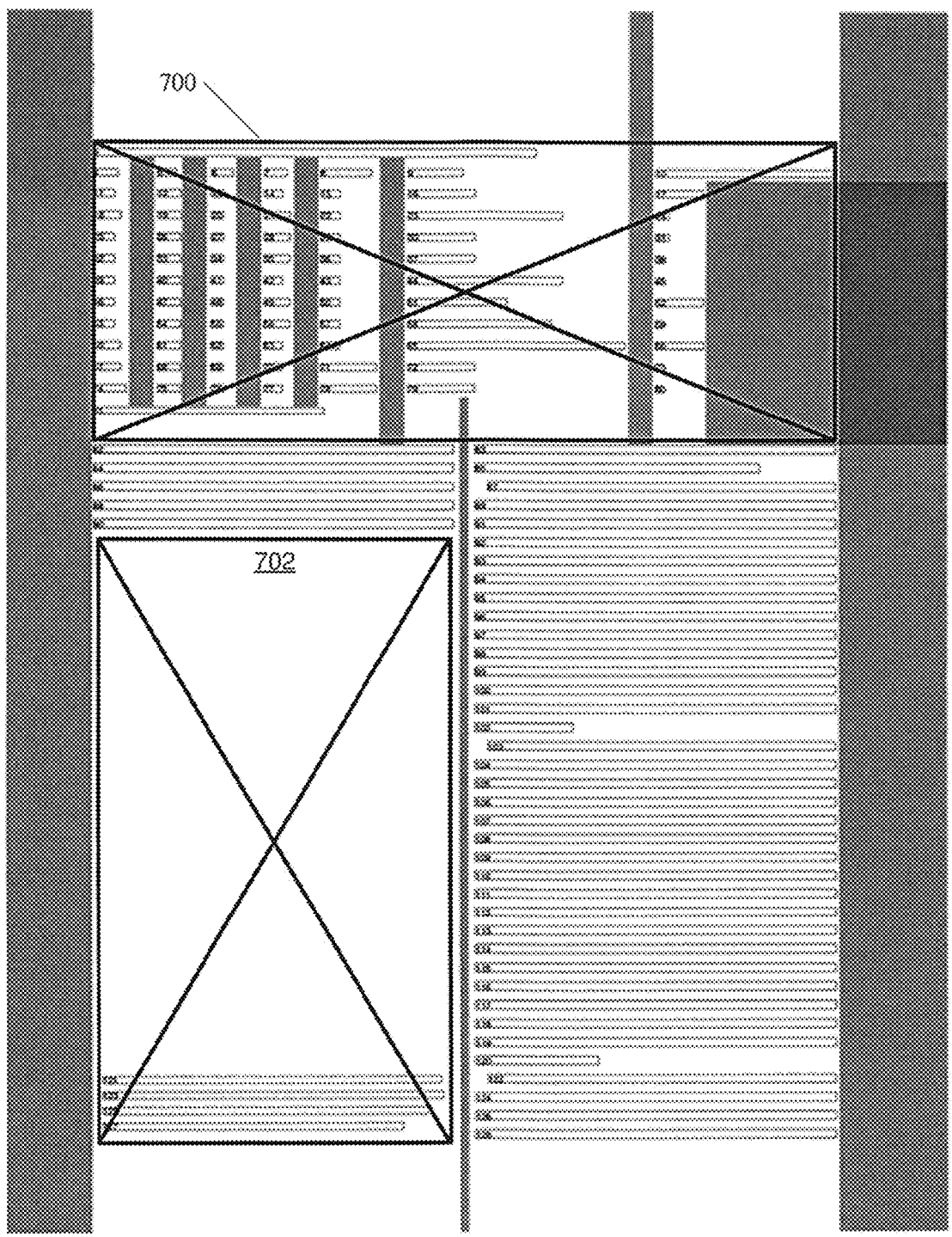
FIG. 8 illustrates the sample page of FIG. 7 showing the results of table and figure identification according to the systems and methods described herein.

FIG. 8 illustrates the sample page of FIG. 7 showing the results of table and figure identification according to the systems and methods described herein. A table that has been identified is indicated by box 700 and a figure that has been identified is indicated by box 702.

Table Detection.

In one embodiment, table detection may be triggered when a line that signals the presence of a table is identified. For example, a line short line that contains the text "Table" followed by a number is a strong indicator that a table is present within the page. Once triggered, table detection may proceed by looking at the space below the signal for the table motif, such as multiple, short columns, multiple lines of text that have the same alignment (e.g., left, center, right, fully justified) in the same column, and so on. Once the boundaries of a table are identified, the system can then calculate the bounding rectangle that encloses the table, and add that to a list of tables identified within that page, and of course add the table boundary rectangles to the visual index.

In one embodiment, table detection involves looping through each page and visiting each line per page. If the word "table" or any word signaling a table has been detected, it is assumed that the space below that signal is potentially a table. In one embodiment, the system may search for areas of denser than usual column boundaries below instances of the initial signal. A bounding rectangle is generated and fit around areas in left, right and downward directions of the initial signal if the column boundary density signals the presence of a table. At the end of the table detection process, there will be a list of bounding rectangles per page encompassing tables.

Figure Detection.

In one embodiment, figure detection may include traversing the lines of the main body in search of the word "figure" or any word signaling a figure. In one embodiment, the system may extend in all directions from the signal location in search of space that is taken up by an image or figure like motifs. If significant evidence and a sufficiently large bounding rectangle encompassing a figure image is detected, then the system may be assume that a figure has been found and begin to extract the figure text underneath the figure signal location. Each line under the text is analyzed using the spatial index and space between lines until a stopping point is reached. In one embodiment, the stopping point is defined as horizontal whitespace that does not intersect a line. The bounding rectangle may then be expanded to encompass the text. In this manner, a list of figure bounding rectangles may be generated for each page. These bounding rectangles may be added to the spatial index for the corresponding page.

Because tables and figures (and their captions) are typically separate narratives that exist in parallel to the main text, lines that are identified as belonging to tables or figures are stored separately so they can be analyzed apart from the main body of flowing lines. The process of detecting and removing figures and tables from the main body of flowing lines enhances the capability of correctly aggregating the lines of the main body into a text flow.

Figure 9:
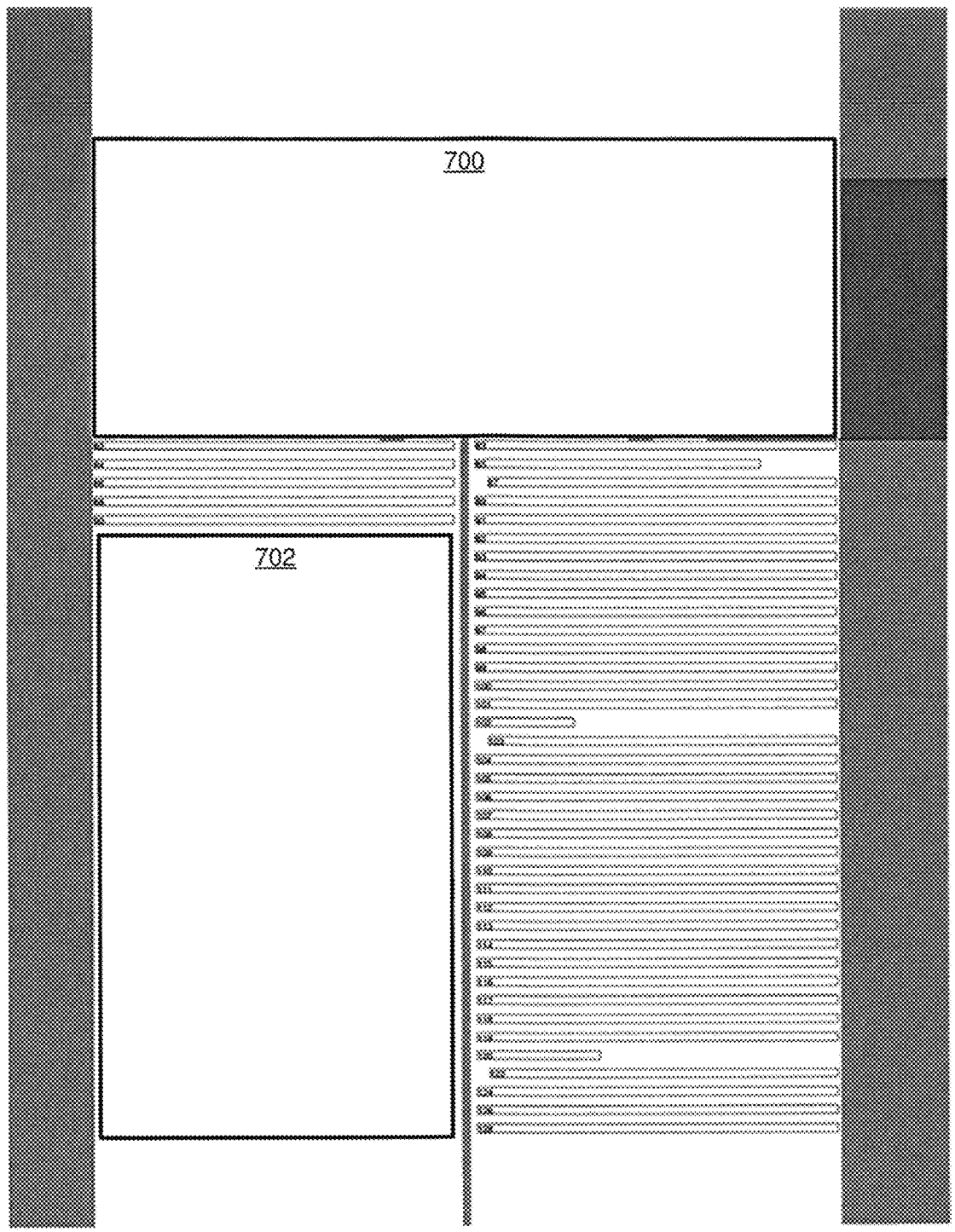
FIG. 9 illustrates the sample page of FIG. 8 showing the results of table and figure extraction according to the systems and methods described herein.

FIG. 9 illustrates the sample page of FIG. 8 showing that lines located within the identified table (box 700) and within the identified figure (box 702) have been removed.

Continuous Text Flow Generation.

Figure 10:
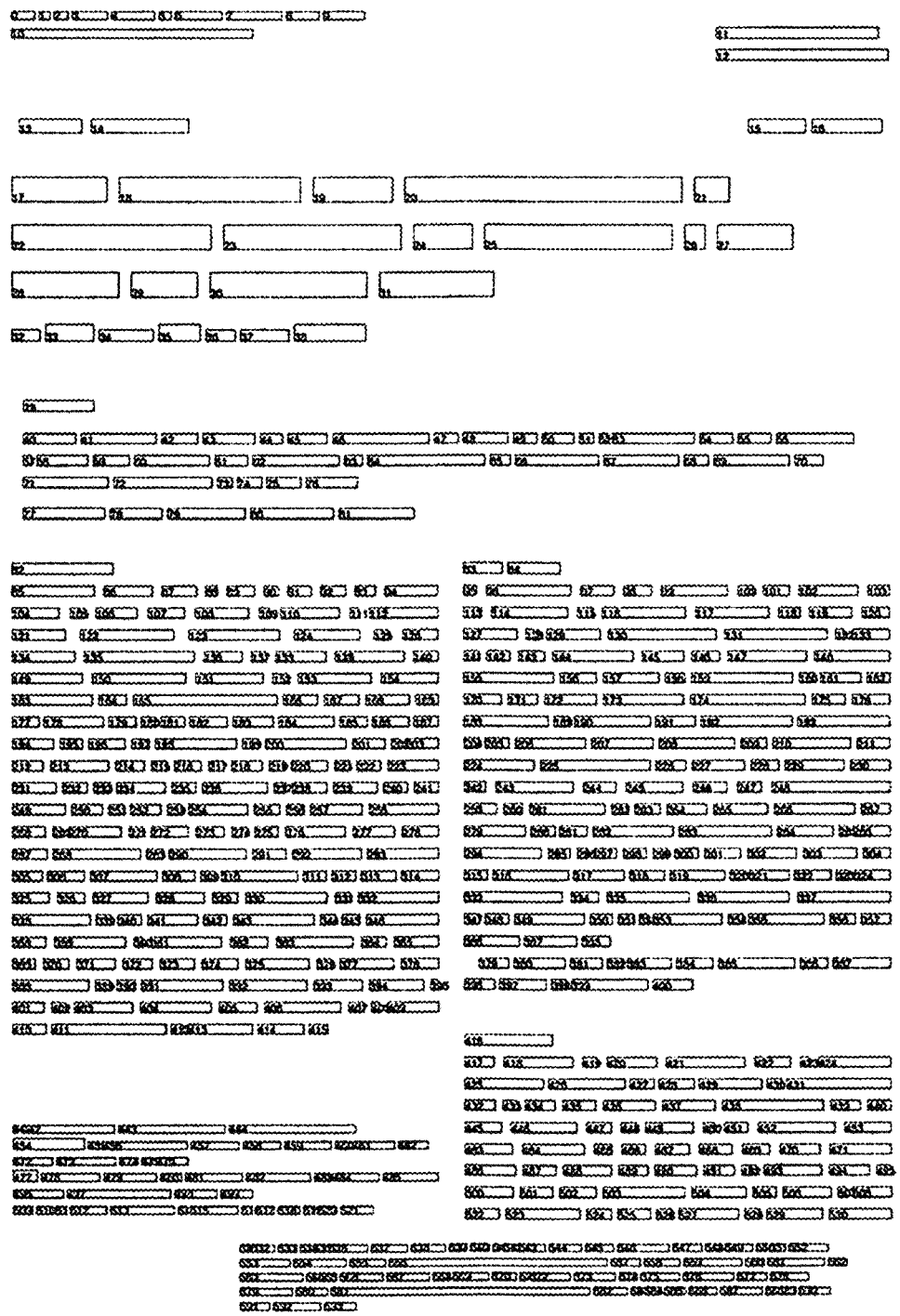
FIG. 10 illustrates another sample page of a document showing the rectangular bounding boxes that indicate the positions for all of the text objects that were found on that page according to the systems and methods described herein.

Once the steps listed above are completed, the system may then generate continuous text flow. FIGS. 8, 9, and 10 illustrate some additional challenges to generation of text flow that may be overcome through the use of a spatial index.

FIG. 10 illustrates another sample page of a document showing the rectangular bounding boxes that indicate the positions for all of the text objects that were found on that page.

Figure 11:
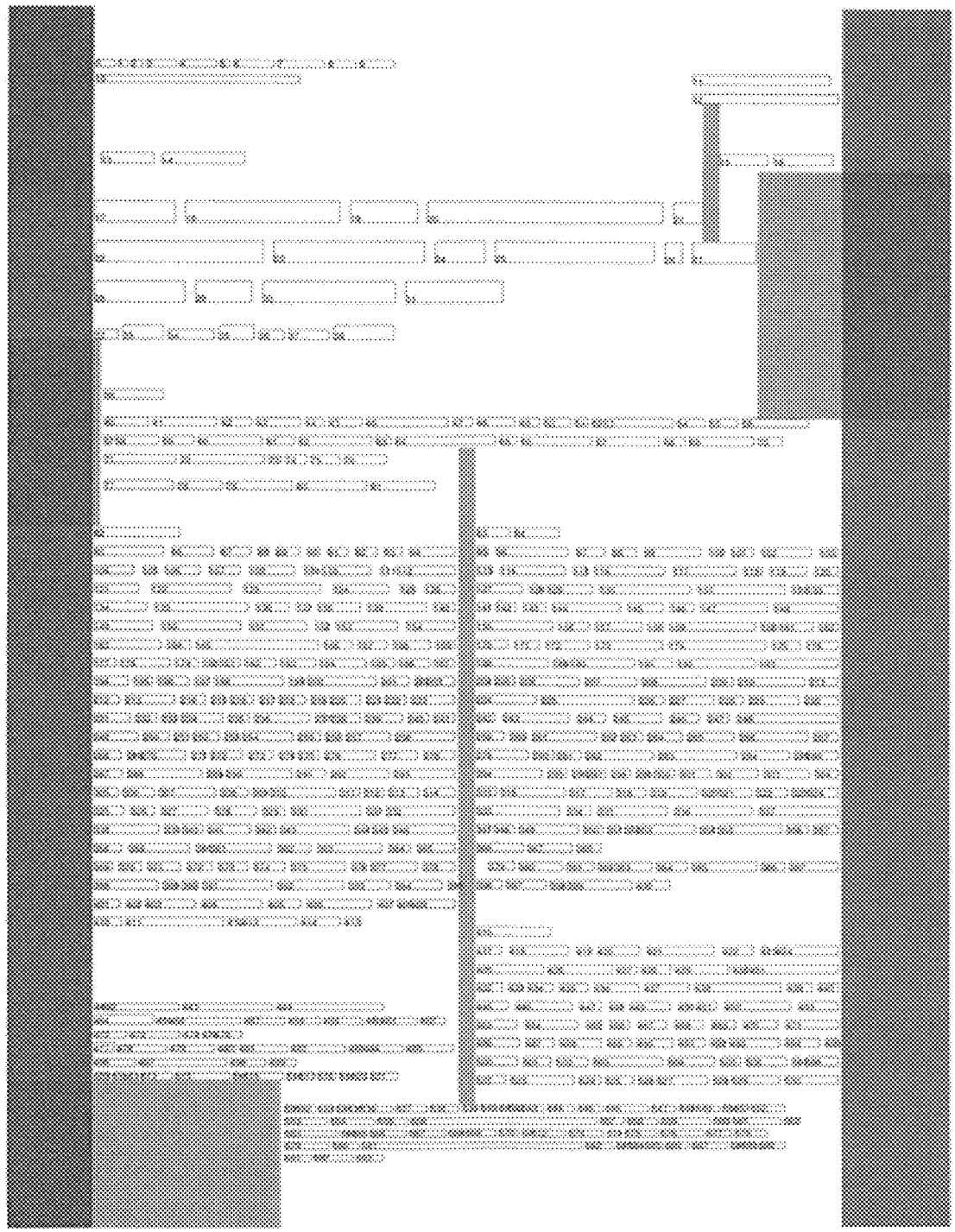
FIG. 11 illustrates the sample page of FIG. 10 showing the results of column detection according to systems and methods described herein.

FIG. 11 shows the results of column detection performed on the page illustrated in FIG. 10 according to systems and methods described herein.

Figure 12:
FIG. 12 illustrates the sample page of FIG. 11 showing the results of aggregation, header/footer removal, and table/figure extraction steps performed according to systems and methods described herein.

FIG. 12 shows the results of the aggregation, header/footer removal, and table/figure extraction steps performed on the page illustrated in FIG. 11. In this example, the system had identified some visual section breaks, shown as shaded horizontal rectangles in FIG. 12. Examples of visual section breaks include, but are not limited to, of a rectangle of significant whitespace that spans the width of the page. These visual section breaks are good candidates for what are herein referred to as "bucket delimiters", which are used to group lines into "buckets".

A "bucket" represents a column of continuous text. Line aggregation is the process of looping through each page and aggregated the lines on that page into continuous flowing text. Lines are ordered left to right and up to down. But since articles can have multiple columns, the lines cannot be simply aggregated. Since the lines are ordered left to right and up to down, the present invention loops through each line in that order. During the line inspection process lines are assigned to buckets. Where there are multiple columns, there will be multiple buckets. In one embodiment, buckets may be numbered in order from left-to-right, top-to-bottom. Bucket delimiters define the top and bottom boundaries of a bucket.

It is noted that the "left-to-right, top-to-bottom" order is convenient for documents written in English or other languages that use left to right text, but other orders may be used. For other languages, such as Chinese and Japanese, which can be written in a top-to-bottom, right-to-left order, the systems and methods described herein may order words, lines, and buckets in a top-to-bottom, right-to-left order, for example, or in any order that is appropriate to the written language. Here also, the spatial index provides enormous flexibility to accommodate such variations. In the embodiment illustrated in FIG. 10, however, buckets are ordered from left to right based on the lines' coordinates.

Figure 13:
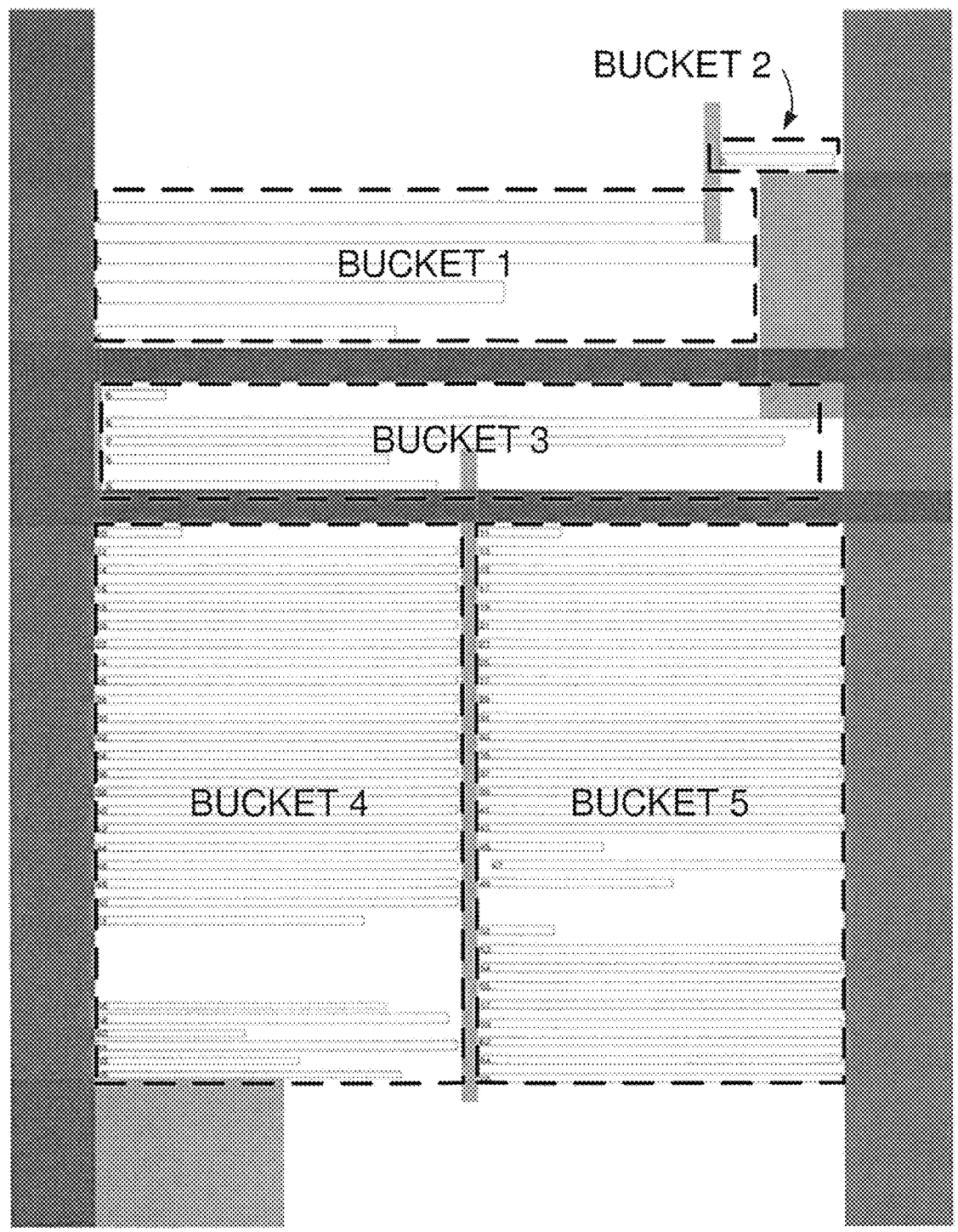
FIG. 13 illustrates the sample page of FIG. 12 with buckets identified and numbered according to an embodiment of the subject matter described herein.

FIG. 13 illustrates the page of FIG. 12 with buckets identified and numbered according to an embodiment of the subject matter described herein. FIG. 13 shows five separate buckets, labeled "Bucket 1", "Bucket 2", "Bucket 3", "Bucket 4", and "Bucket 5". The process of "dumping a bucket" is defined by removing all lines from the bucket, adding the lines in order to the main text flow structure and removing the bucket from the list of buckets. Here, too, bucket delimiters are used to help determine the correct order in which the buckets should be dumped. If a bucket delimiter that spans the entire page is found, then buckets above that bucket delimiter are dumped from left to right to add to the continuous text flow.

Lines may also be associated with a particular bucket, and this association may be stored in a list of lines for that bucket. The bucket object so created may be associated with the page. In one embodiment, the rectangular coordinates that enclose all lines that belong to a particular bucket may be stored in a list and associated with a page. All of the above-described constructs—lines, buckets, rectangles, etc., may be stored in the spatial index for use during the entire process.

Once all buckets are identified within a page, the existing buckets are dumped in to the continuous text flow structure from left to right. In the example page illustrated in FIG. 13, the buckets are dumped in the numerical order that they are named, i.e., starting with Bucket 1 and ending with Bucket 5.

Probabilistic Natural Language Processing Model for Aggregating Lines.

The subject matter described herein includes using a probabilistic model to validate and/or disambiguate line aggregation. There are times during line aggregation when there is ambiguity as to which column flows to which column, or if a line should flow to the next line. This may occur due to complex page layouts, for example, such as when a figure spans multiple columns of text: should the buckets be emptied in the order of top left, bottom left, top right, then bottom right, or should they be emptied in the order of top left, top right, bottom left, then bottom right? Moreover, if some spurious text is inserted within the main flow of a column's lines, but is not meant to be read as part of the main text flow, then this text needs to be detected. In one embodiment, the methods and systems described herein use natural language processing (NLP) techniques to help improve line aggregation.

A language model is a probability distribution over a sequence of words. In one embodiment, by using a language model, the tool is able to understand the likelihood that aggregating two lines together is valid. In the case where it is spatially ambiguous as to which lines flow together, the tool can apply the NLP approach by analyzing the sequence of words at a point of merger between two lines to help make intelligent decisions about stitching together the lines in question and creating correct text flow.

Sectionalization.

In one embodiment, once a correct text flow has been created, the system may then iterate through the ordered lines and assign each line to a section. After contiguous lines are generated during the line aggregation process, the lines can then be traversed and sectionalized based on section heading information. Sections of scientific articles are usually flagged by a section header such as Methods and Materials or Discussion. The systems and methods described herein can now iterate through each line, and can assume, thanks to the preceding steps of the workflow, that the lines are in correct flowing order. By using pattern matching to identify sections, by identifying section headings, for example, a line is assigned to the identified section. Sections include, but are not limited to, Abstract, Introduction, Methods, Results, Discussion, References, Conclusions, and Acknowledgements.

Reference Processing.

Once sectionalizing has occurred, the References section, if extant, may be processed. In one embodiment, the References section may be split into individual references. These individual references may be stored in a references list that is associated with the document. Some or all of the information contained within a single reference—e.g., author name, publication name, date of publication, and so on—may be stored in a table or database for that purpose, not only for use during document processing but also as a resource for other purposes, including use by entities other than the systems and methods described herein.

Splitting the References section into a list of individual references can be accomplished using a variety of methods. If the references are numbered, for example, then the tool may detect that there is a numbered list and use the numbers at the beginning of each reference to delimit between references. If numbers are not present, then indention patterns may be used to group lines into individual reference. If indentions are not present, the tool can look for whitespace between individual references. Other techniques, including regular expression matching and NLP, may also be used to delimit references. It should be noted that some of these techniques may be applied even without having performed the sectionalization steps described above.

In one embodiment, references processing includes inline reference matching. In one embodiment, this may involve identifying inline citation candidates in the main body of text. Common manifestations of inline citations include numbers, if the references are numbered, and author name or other subset of the reference information, if the references are not numbered. The citations are often delimited by being contained in parentheses or brackets or by being displayed as a superscript. These and other patterns of manifestation may be used by the tool to identify occurrences of inline citations. Inline citations may also be referred to as "in-text citations" or "inline references".

Once an inline citation candidate is found, it may be associated with the individual reference to which it refers. It is relatively easy to relate an inline citation to its reference information if the references are numbered and the inline citation is simply a number surrounded by square brackets, for example, but textual matching is more complicated. In one embodiment, matching uses a name and a year to match the inline citation to the pertinent reference. In the case of a tie, or where the information within an inline citation matches more than one reference, logic is applied to find the best match, and may involve consideration of additional information in the context of the inline citation. Examples of reference processing include, but are not limited to: inserting at least some of the reference entry into the text where the inline citation is located; inserting, into the location of the inline citation, a hyperlink to the reference entry; and generating an index that lists the locations of inline references within the text.

Detailed Implementations/Pseudocode:

The flowcharts illustrated in FIGS. 14 through 32 illustrate one specific implementation of the subject matter described herein, using high-level language and pseudocode. FIGS. 14-32 illustrate exemplary processes that may be implemented by a system according to an embodiment of the subject matter described herein.

Use Cases.

The performance improvements made possible by this synergy allow the creation of systems that have capabilities that far exceed human capability, such as the ability to analyze, process, and store information about huge numbers of documents in a very short amount of time without the need to understand a priori the document structure or contents. One example application is the use of the methods and systems described herein to automatically analyze and extract information from a vast collection of scientific papers.

FIGS. 14 through 17 illustrate an exemplary process for detecting column separators according to an embodiment of the subject matter described herein.

Figure 14:
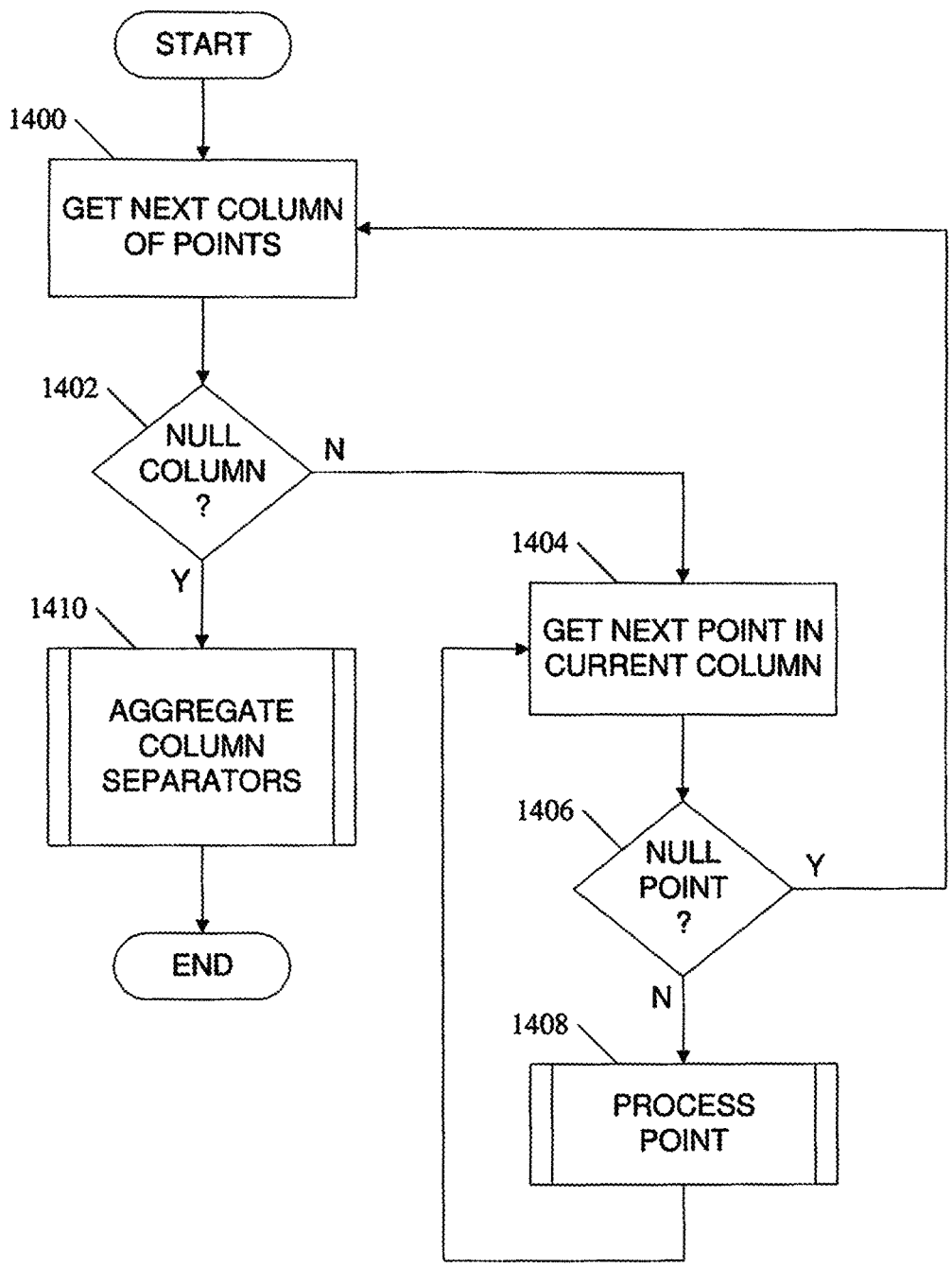
FIGS. 14 through 17 illustrate an exemplary process for detecting column separators according to an embodiment of the subject matter described herein.

In the embodiment illustrated in FIG. 14, detection of column separators starts with getting a column of points (block 1400). For example, a page may have a number of columns C, arbitrarily numbered from left to right as column 1 through column C. In one embodiment, the process may start with column 1 and progress sequentially to column C each time incrementing by one column or incrementing by more than one column, e.g., skipping every 2, 3, or some other number of columns. The column is checked to see if it is null (block 1402). If the column is not null, the process gets the next point in the current column (block 1404) and checks to see if it is a null point (block 1406). If the point is not null, the point is processed (block 1408) and the process returns to block 1404, looping until a null point is found at block 1406, at which time the process returns to block 1400 to get the next column of points. This continues until a null column is found. Once a null column is detected at block 1402, the column separators are aggregated (block 1410) and the process ends.

Figure 15:
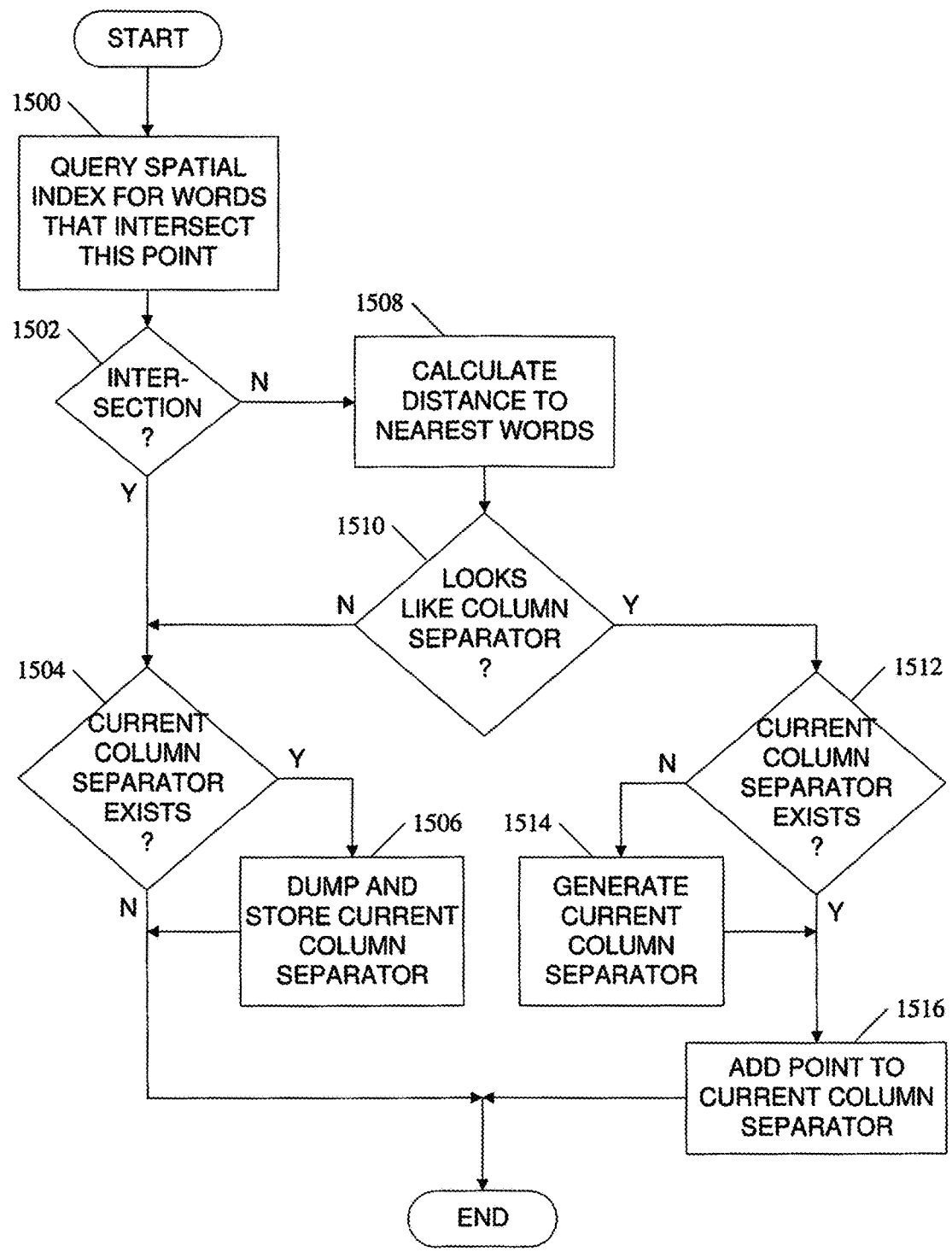

FIG. 15 shows the steps of block 1408 in more detail according to an embodiment of the subject matter described herein. In one embodiment, processing a point includes querying the spatial index for words that intersect that particular point (block 1500). If, at block 1502, an intersection is found, the process checks to see if a current column separator exists at that column (block 1504). If so, the current column separator is dumped and stored (block 1506), and the process ends. If, at block 1504, no current column separator exists, the process immediately ends. If, at block 1502, an intersection is not found, the distance to the nearest words is calculated (block 1504). Based on the distance(s), the point may or may not look like it might be a column separator (block 1506), and if not, the process goes to block 1504 as previously described. If the point looks like it might be a column separator, the process checks to see if a current column separator exists at that column (block 1512). If not, a current column separator is generated (block 1514), and the point is added to it (block 1516) and the process ends. If, at block 1512, a current column separator already exists, the point is simply added to it (block 1516), and the process ends.

Figure 16:
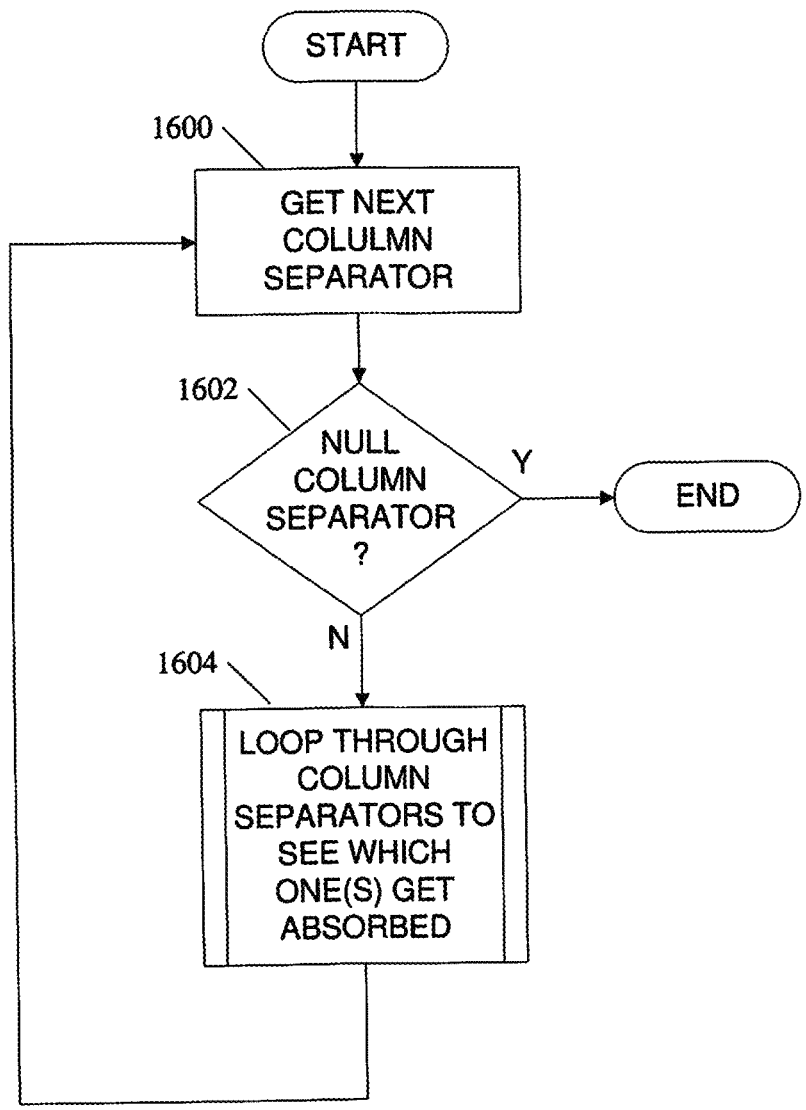

FIG. 16 shows the steps of block 1410 in more detail according to an embodiment of the subject matter described herein. In one embodiment, aggregating column separators includes getting the next column separator (block 1600). At block 1602, the process checks to see if there are no more column separators (e.g., a null column separator is returned). If so, the process ends. If not, the process goes to block 1604, which loops through column separators to see which one(s) get absorbed, and then returns to block 1600. This repeats until a null column is detected at block 1602.

Figure 17:
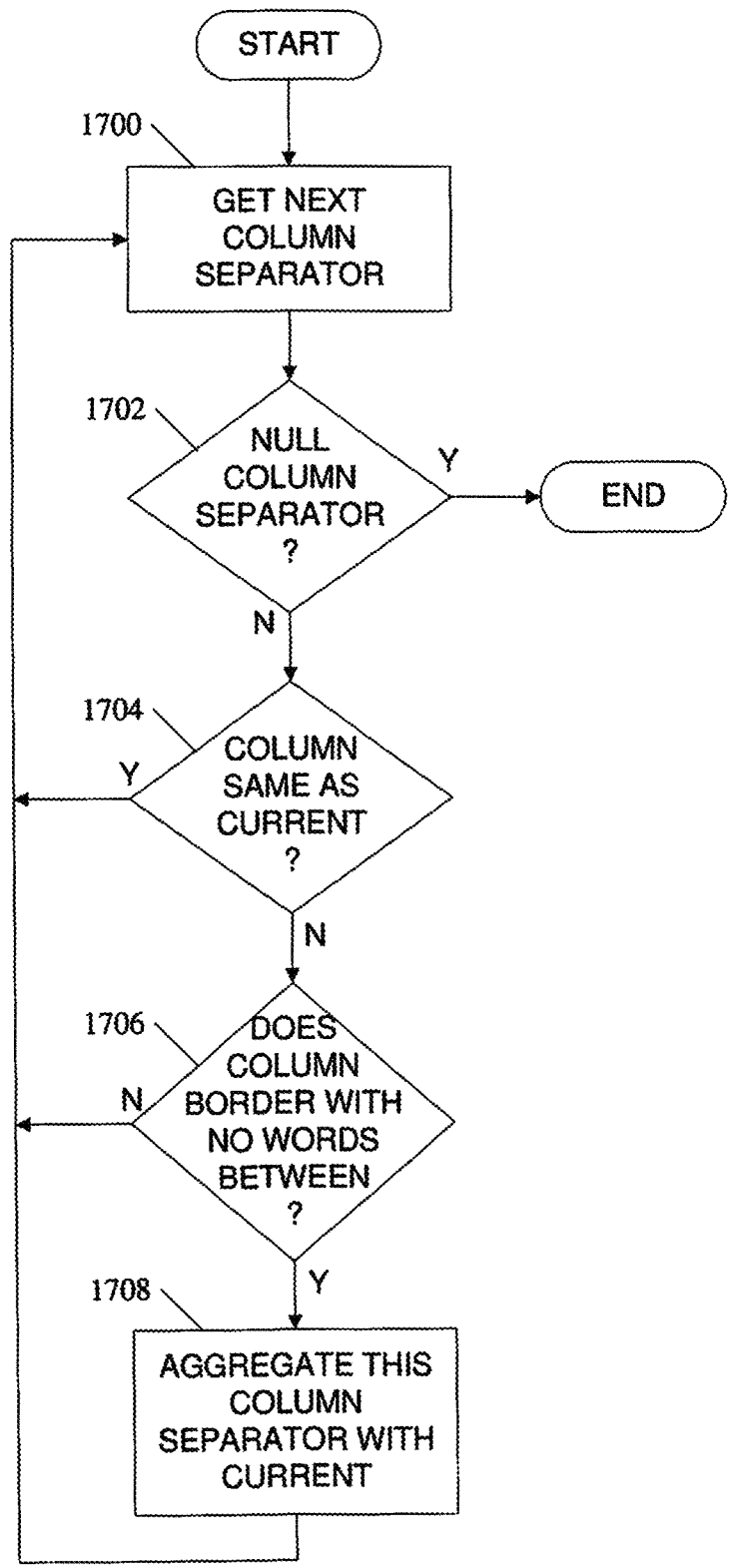

FIG. 17 shows the steps of block 1604 in more detail according to an embodiment of the subject matter described herein. In one embodiment, looping through column separators to see which one(s) get absorbed includes getting the next column separator (block 1700). At block 1702, the process checks if a null column separator is returned. If not, the process checks to see if the column is the same as the current column (block 1704), and if so, the process returns to block 1700, since this column has already been found. If, at block 1704, the column is not the same as the current column, the process goes to block 1706, which checks to see if the column borders another column, with no words in between. If not, the process returns to block 1700; if so, the column separator is aggregated with the current column separator (block 1708), before returning to block 1700. The process loops until a null column separator is found (e.g., until there are no remaining column separators.)

Figure 18:
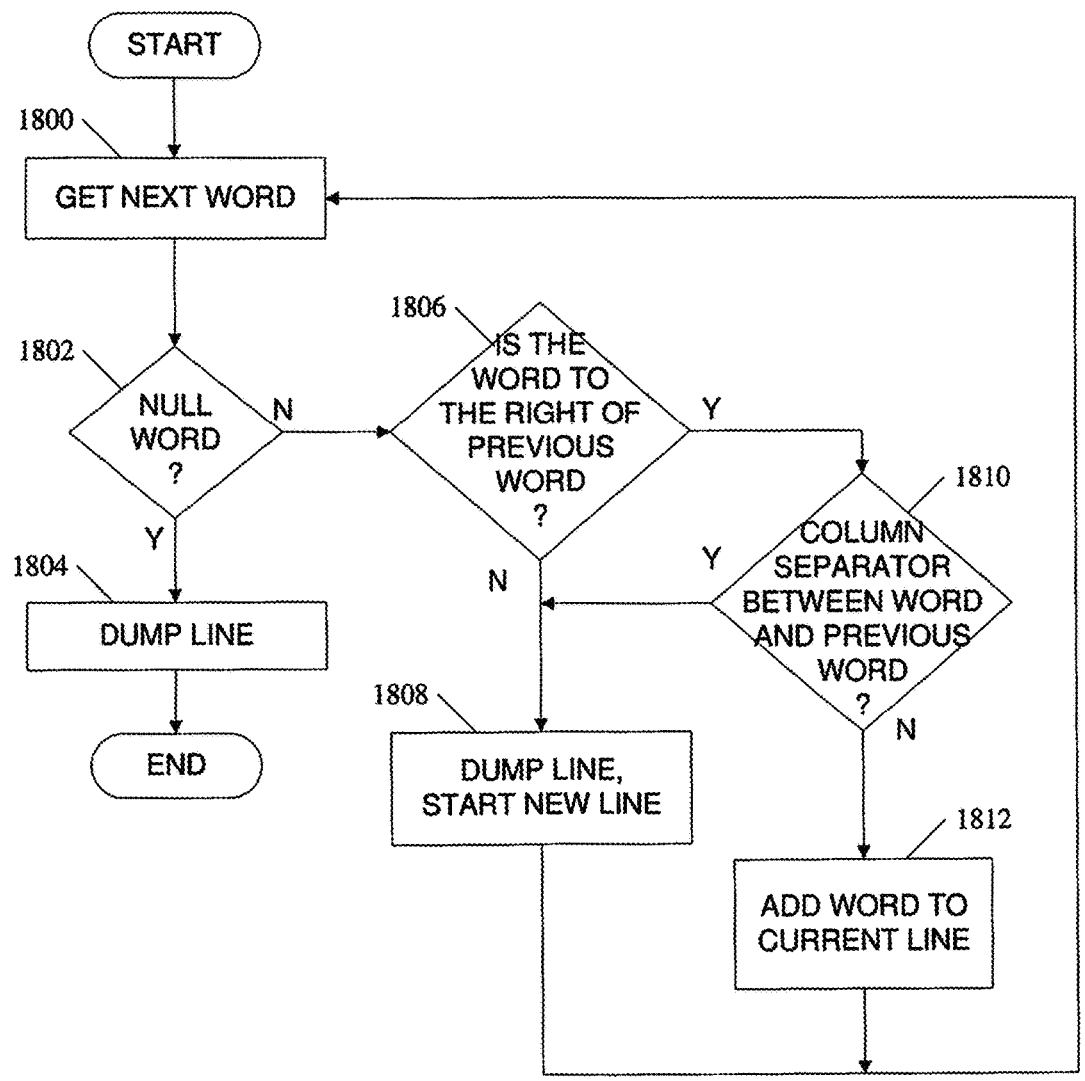
FIG. 18 illustrates an exemplary process for aggregating words into lines according to an embodiment of the subject matter described herein.

FIG. 18 illustrates an exemplary process for aggregating words into lines according to an embodiment of the subject matter described herein. In the embodiment illustrated in FIG. 18, the process starts by getting the next word (block 1800) and checking to see if it is a null word (block 1802). If so, then there are no more words on the page, so the current line is dumped (block 1804), and the process ends. If, at 1802, the next word is not null, the process checks to see if the word is to the right of the previous word (block 1806). If not, the next word is treated as not part of the current line, so, at block 1808, the current line is dumped and a new line is started, after which the process returns to block 1800. If, at block 1806, the next word is to the right of the previous word, it may be a continuation of the current line, unless there is a column separator between the new word and the previous word. This is checked for in block 1810. If there is no column separator there, the word is added to the current line (block 1812), and the process repeats from block 1800. If there was a column separator there, the process continues to step 1808 as described above.

Figure 19:
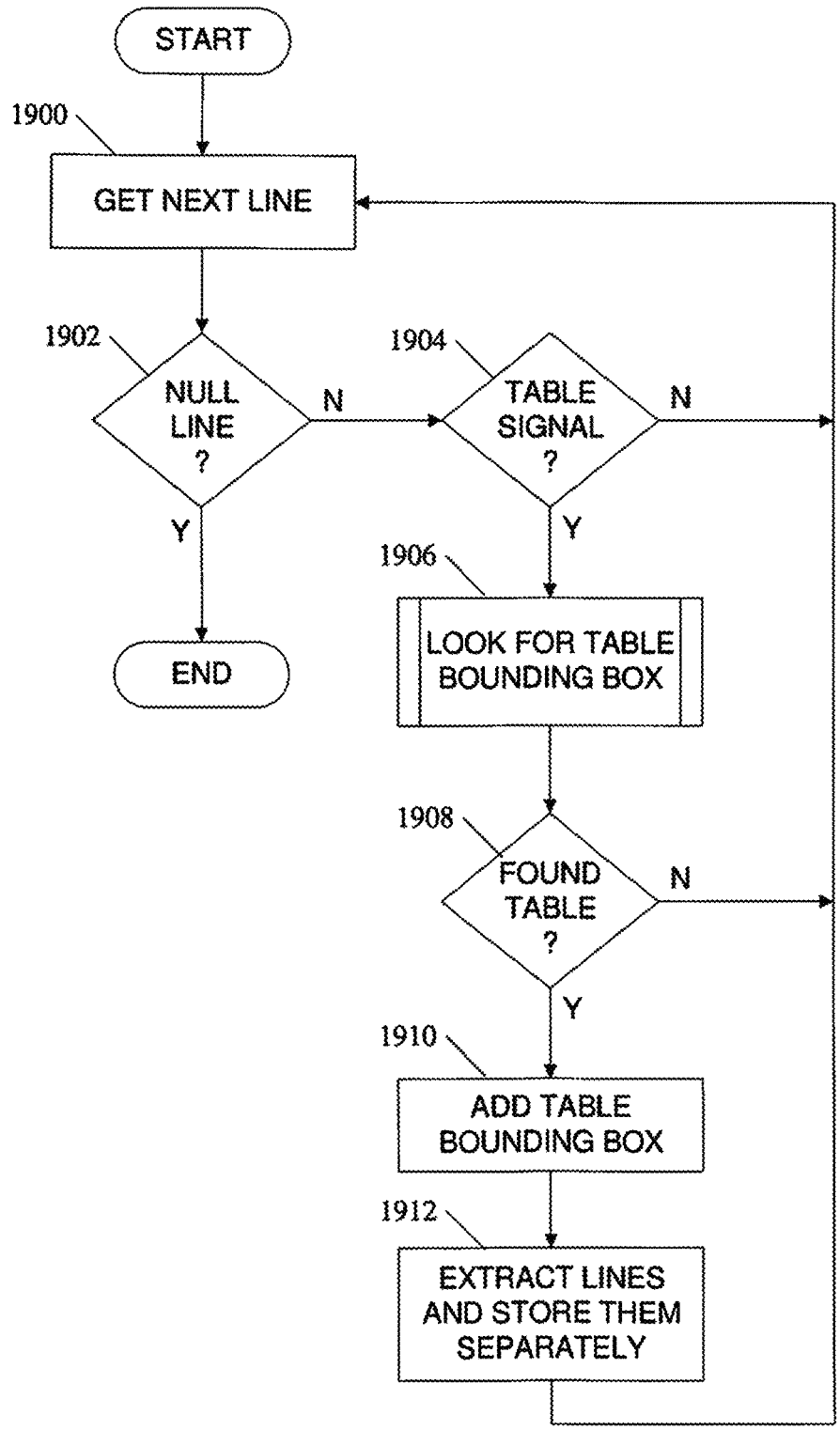
FIGS. 19 and 20 illustrate an exemplary process for table detection according to an embodiment of the subject matter described herein.
Figure 20:
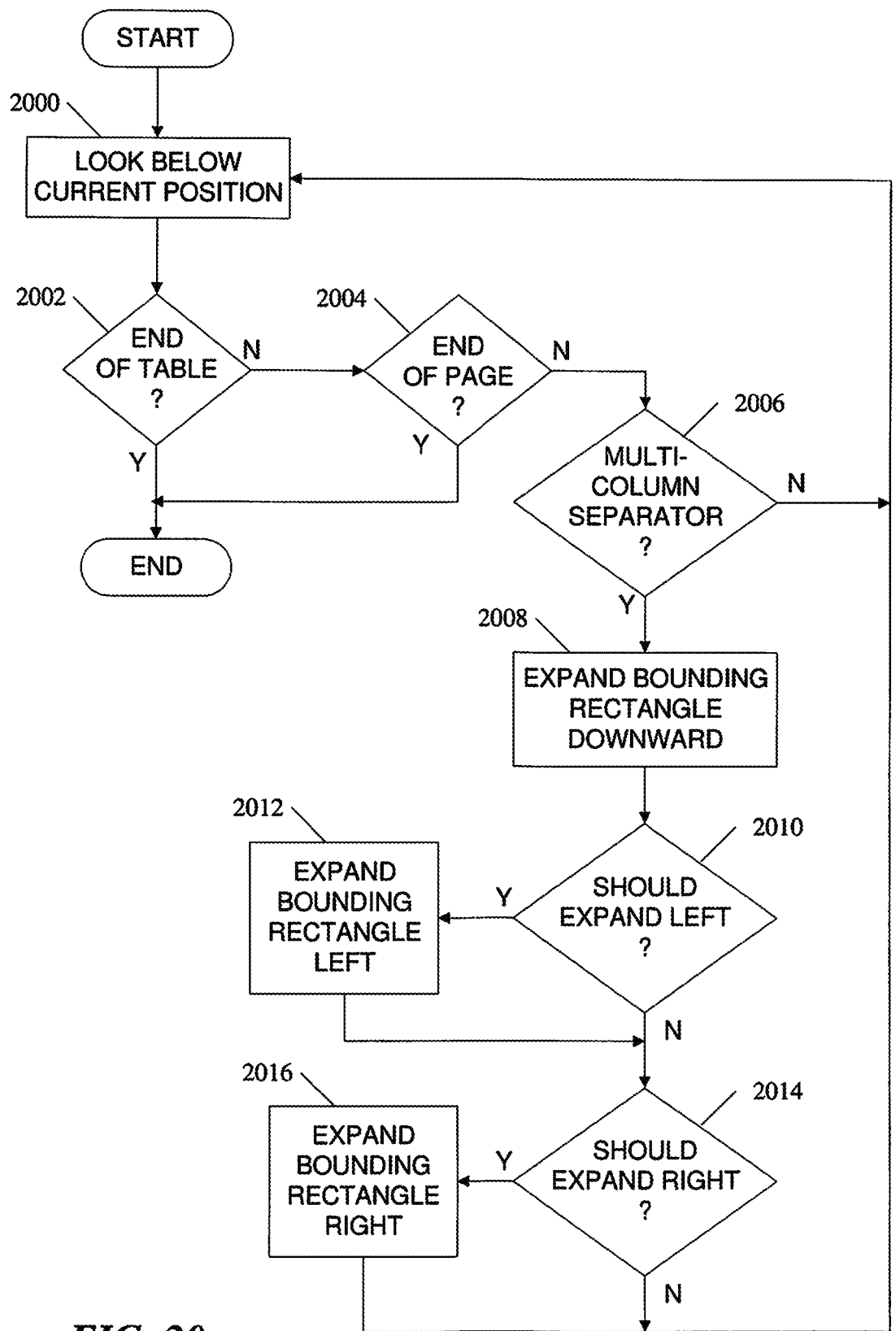

FIGS. 19 and 20 illustrate an exemplary process for table detection according to an embodiment of the subject matter described herein.

In the embodiment illustrated in FIG. 19, the process starts by getting the next line (block 1900). If a null line is returned (block 1902), the process ends. Otherwise, the process checks for some tell-tale, indication, or signal that there might be a table (block 1904). If a table signal is not found, the process repeats from block 1900. If a table signal is found, the process looks for a table bounding box (block 1906). If a table is found (block 1908) a table bounding box is added (block 1910) and lines are extracted from the table and stored separately from the lines of the page or lines in figures (block 1912). If no table was found, the process gets the next line 1900. This continues until a null line is found at block 1902.

FIG. 20 shows the steps of block 1906 in more detail according to an embodiment of the subject matter described herein. In one embodiment, looking for a table bounding box includes looking below the current position (block 2000). If the end of the table is found (block 2002) or the end of the page is found (block 2004), the process ends. Otherwise, the process goes to block 2006, checking to see if there is a multi-column separator. If not, the process loops from block 2000. If there is a multi-column separator, the process expands the bounding rectangle downward (block 2008), then checks to see if the bounding rectangle should be expanded to the left (block 2010), performing that expansion if needed (block 2012), and checks to see if the bounding rectangle should be expanded to the right (block 2014), performing that expansion if needed as well (block 2016). The process loops from block 2000 until the table and/or the page ends.

Figure 21:
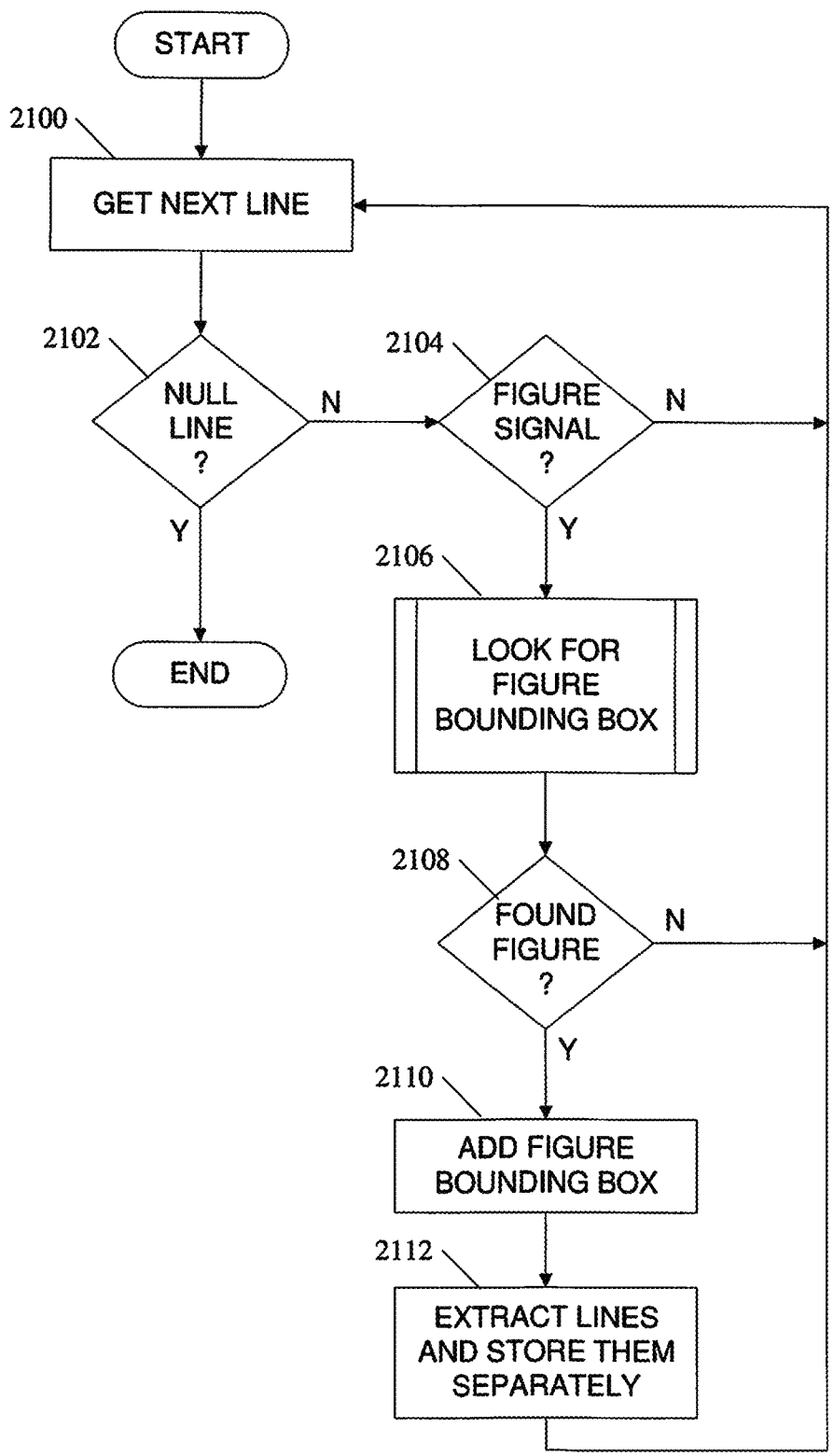
FIGS. 21 through 23 illustrate an exemplary process for figure detection according to an embodiment of the subject matter described herein.
Figure 22:
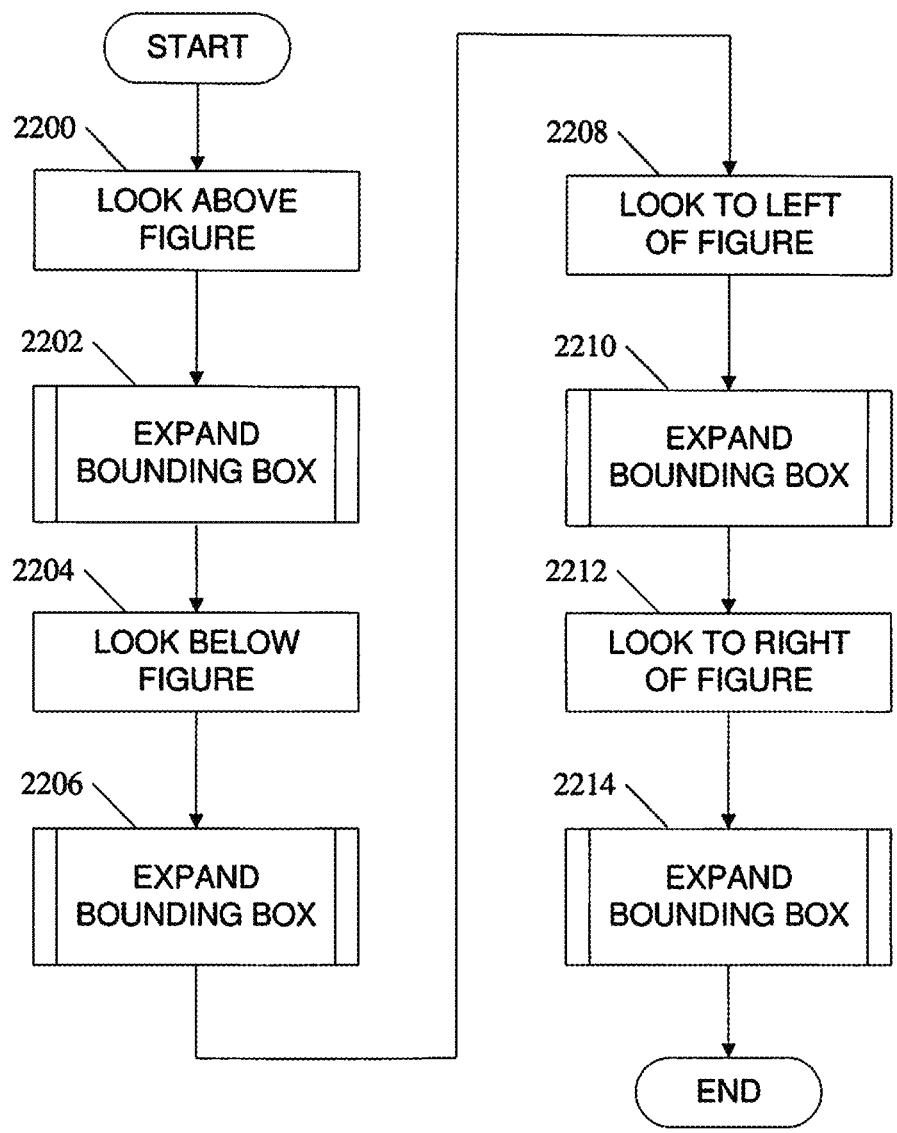
Figure 23:
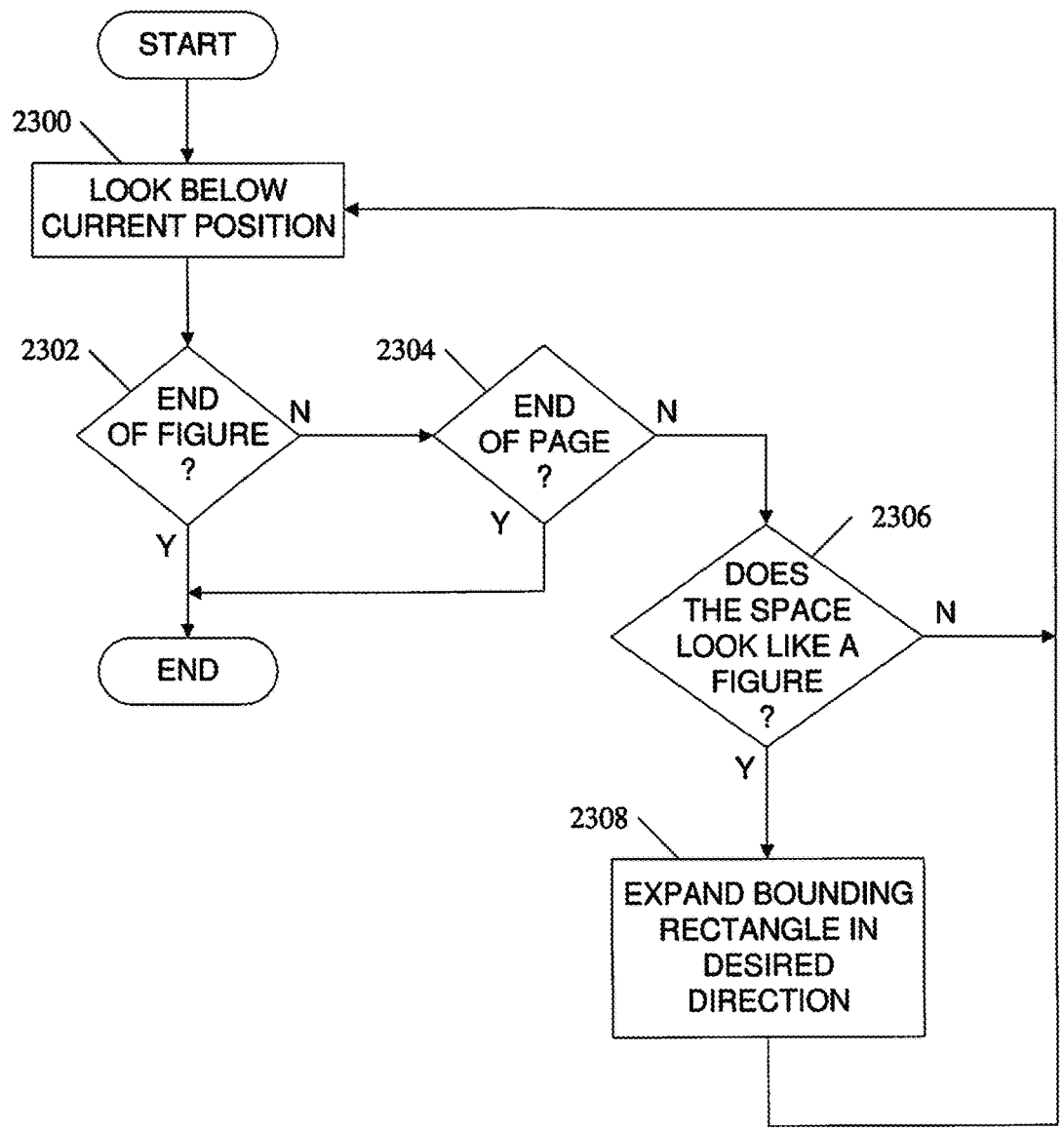

FIGS. 21 through 23 illustrate an exemplary process for figure detection according to an embodiment of the subject matter described herein.

In the embodiment illustrated in FIG. 21, the process starts by getting the next line (block 2100) and checking to see if a null line was returned (block 2102). If so, the process ends. If a null line was not returned, the process checks to see if there is any indication that a figure was found, e.g., whether a figure signal was detected (block 2104). If no figure signal was found, the process returns to block 2100. If a figure signal was detected at block 2104, the process looks for a figure bounding box (block 2106) and checks whether a figure was found (block 2108). If, at block 2108, a figure is not found, the process returns to block 2100. If a figure is found, the figure bounding box is added (block 2110) and the lines associated with the figure are extracted and stored separately (block 2112).

FIG. 22 illustrates the steps of block 2106 in more detail. In one embodiment, searching for a figure bounding box includes looking above the figure (block 2200) and expanding the bounding box (block 2202) as needed. Similarly, the process looks below the figure (block 2204), expanding the bounding box as needed (block 2206), looking to the left of the figure (block 2208), expanding the bounding box as needed (block 2210), looking to the right of the figure (block 2212), and expanding the bounding box as needed (block 2214). The order of search and expansion (e.g., above, then below, then left, then right) is somewhat arbitrary and chosen for illustrative purposes. This order can be changed without departing from the scope of the invention.

FIG. 23 illustrates the steps of expanding a bounding block. In one embodiment, the process starts with looking below the current position (block 2300) and the checking whether the end of the figure has been detected (block 2302). If so, the process ends. If the end of the figure has not been detected, the process checks whether the end of the page has been reached (block 2304), and if so, the process ends. If, at block 2304, the end of the page has not been reached, the process checks whether the space looks like a figure (block 2306). If not, the process returns to block 2300, but if so, at block 2308 the bounding rectangle is expanded in the desired direction (up, down, left, or right) and the process returns to block 2300.

FIGS. 24 through 27 illustrate an exemplary process for line aggregation and text flow generation according to an embodiment of the subject matter described herein.

Figure 24:
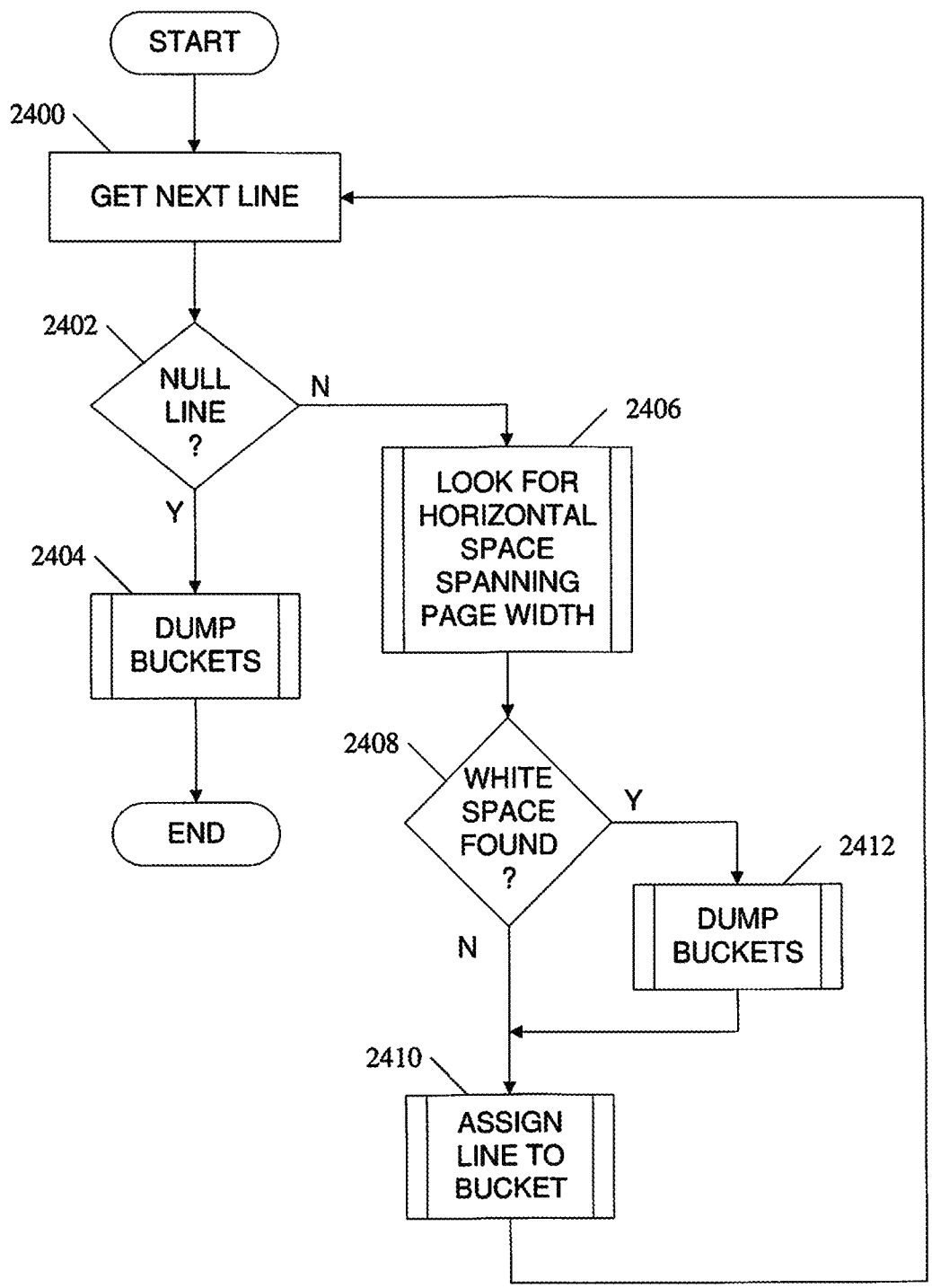
FIGS. 24 through 27 illustrate an exemplary process for line aggregation and text flow generation according to an embodiment of the subject matter described herein.

In the embodiment illustrated in FIG. 24, the process for line aggregation begins by getting the next line (block 2400) and checking to see if a null line was returned (block 2402). If so, this indicates that all lines have been processed, so the buckets are dumped (block 2404) and the process ends. If not, the process looks for horizontal space spanning the page width (block 2406). If white space is not found, the line is assigned to a bucket (block 2410) and the process returns to block 2400. If white space is found, the current buckets are dumped (block 2412) and the line is assigned to a new bucket (block 2410).

Figure 25:
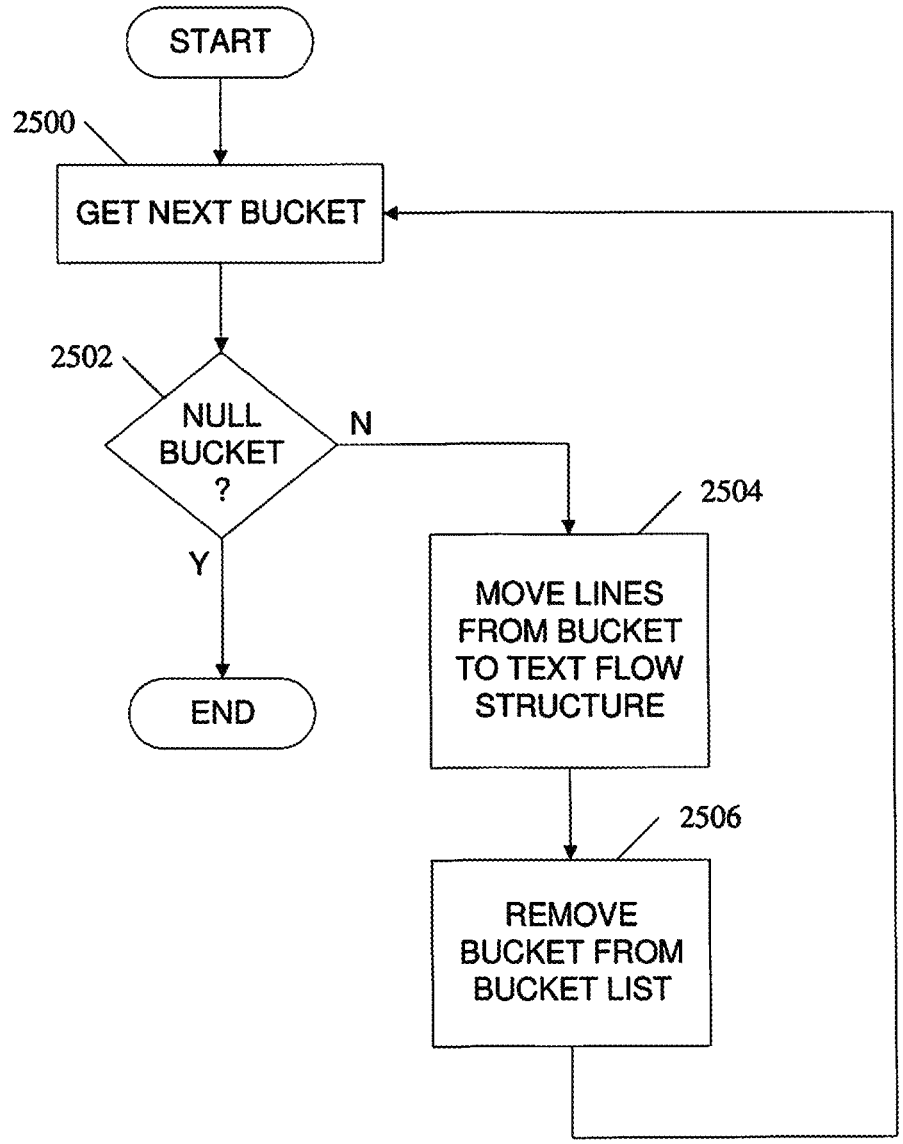

FIG. 25 illustrates the process of block 2404 in more detail. In one embodiment, the process of dumping buckets starts by getting the next bucket (block 2500) then checking to see if a null bucket is returned (block 2502), in which case the process ends. If a null bucket is not returned, lines are moved from the bucket to the text flow structure (block 2504) and the bucket is removed from the bucket list (block 2506).

Figure 26:
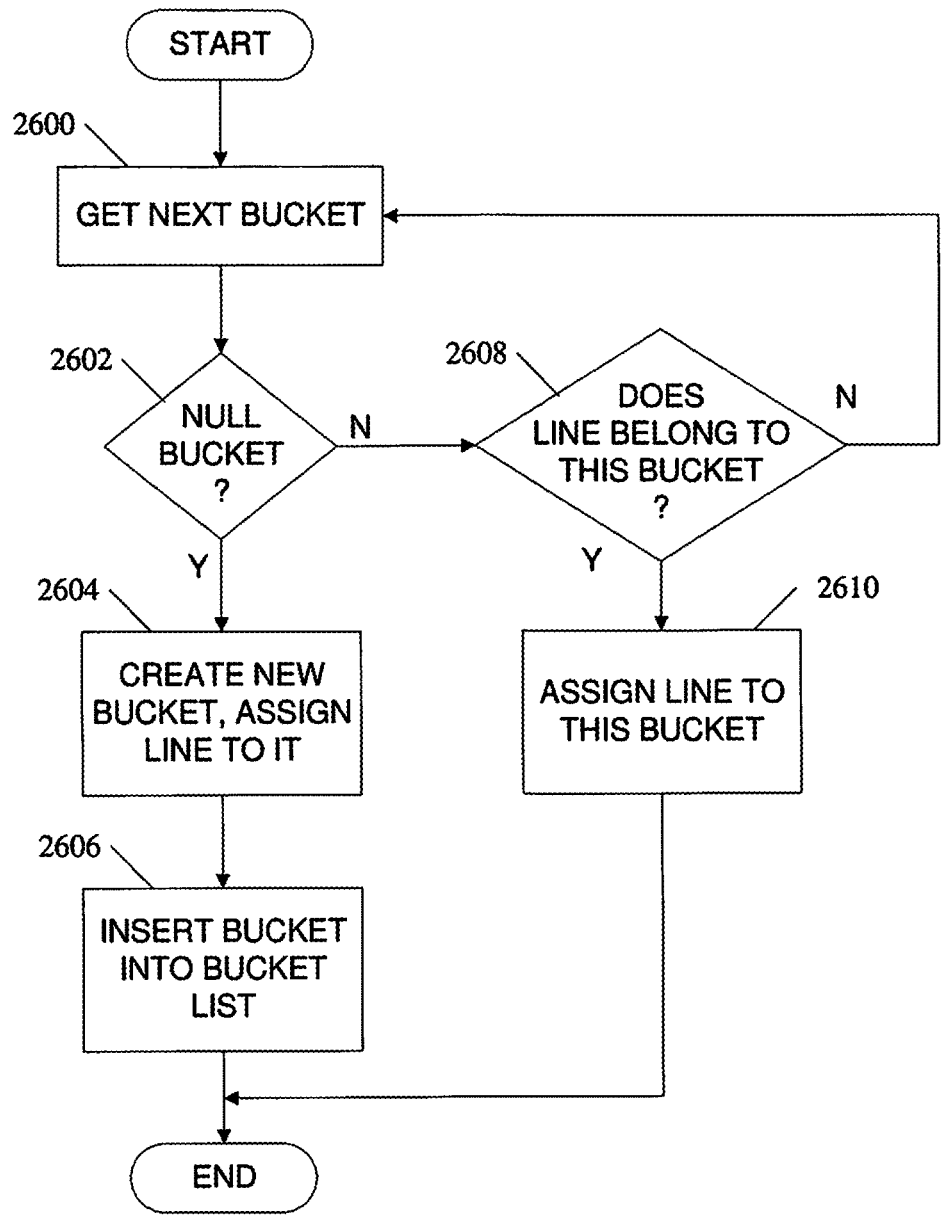

FIG. 26 illustrates the processes of blocks 2410 and 2412 in more detail. In one embodiment, the process starts by getting the next bucket (block 2600) then checking to see if a null bucket is returned (block 2602). If there is no bucket, a new bucket is created and the line is assigned to it (block 2604), and the bucket is inserted into the bucket list (block 2606). If, at block 2602, there was a bucket, the process includes checking to see whether the line belongs to that bucket (block 2608). If not, the process returns to block 2600. If the line belongs to that bucket, the line is assigned to that bucket (block 2610), and the process ends.

Figure 27:
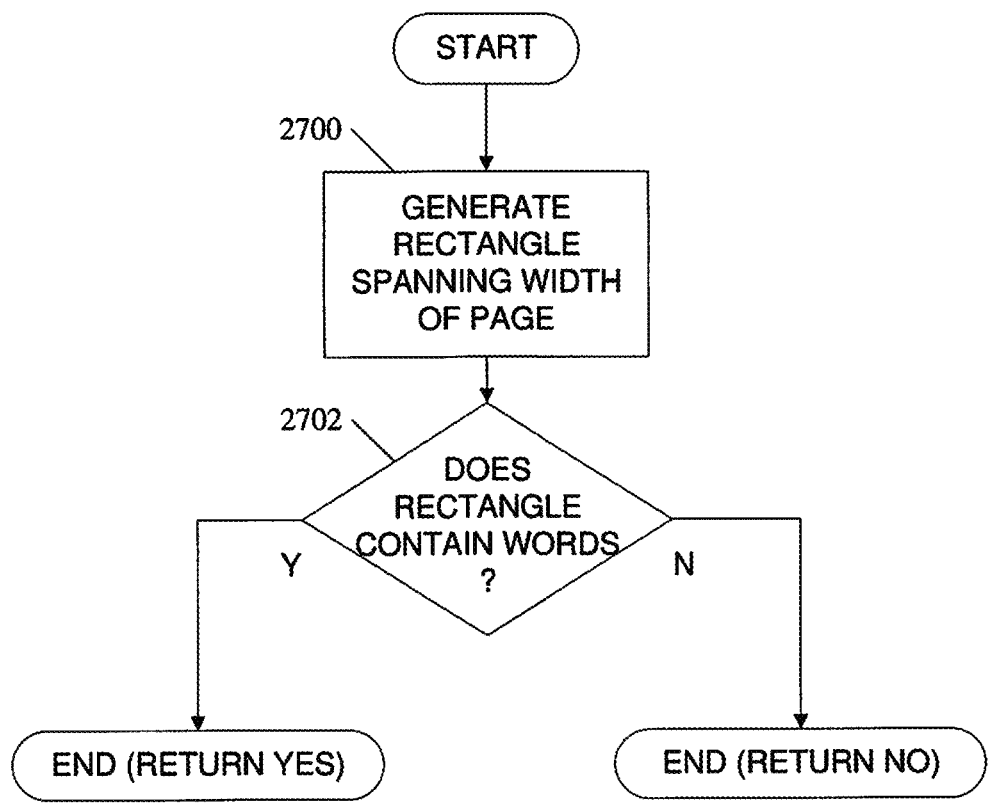

FIG. 27 illustrates the process of block 2406 in more detail. In one embodiment, the process starts by generating a rectangle that spans the width of the page (block 2700) and determining whether the rectangle contains words (block 2702), e.g., by using a spatial query. If the rectangle contains words, the process returns with a YES value, otherwise the process returns with a NO value.

Figure 28:
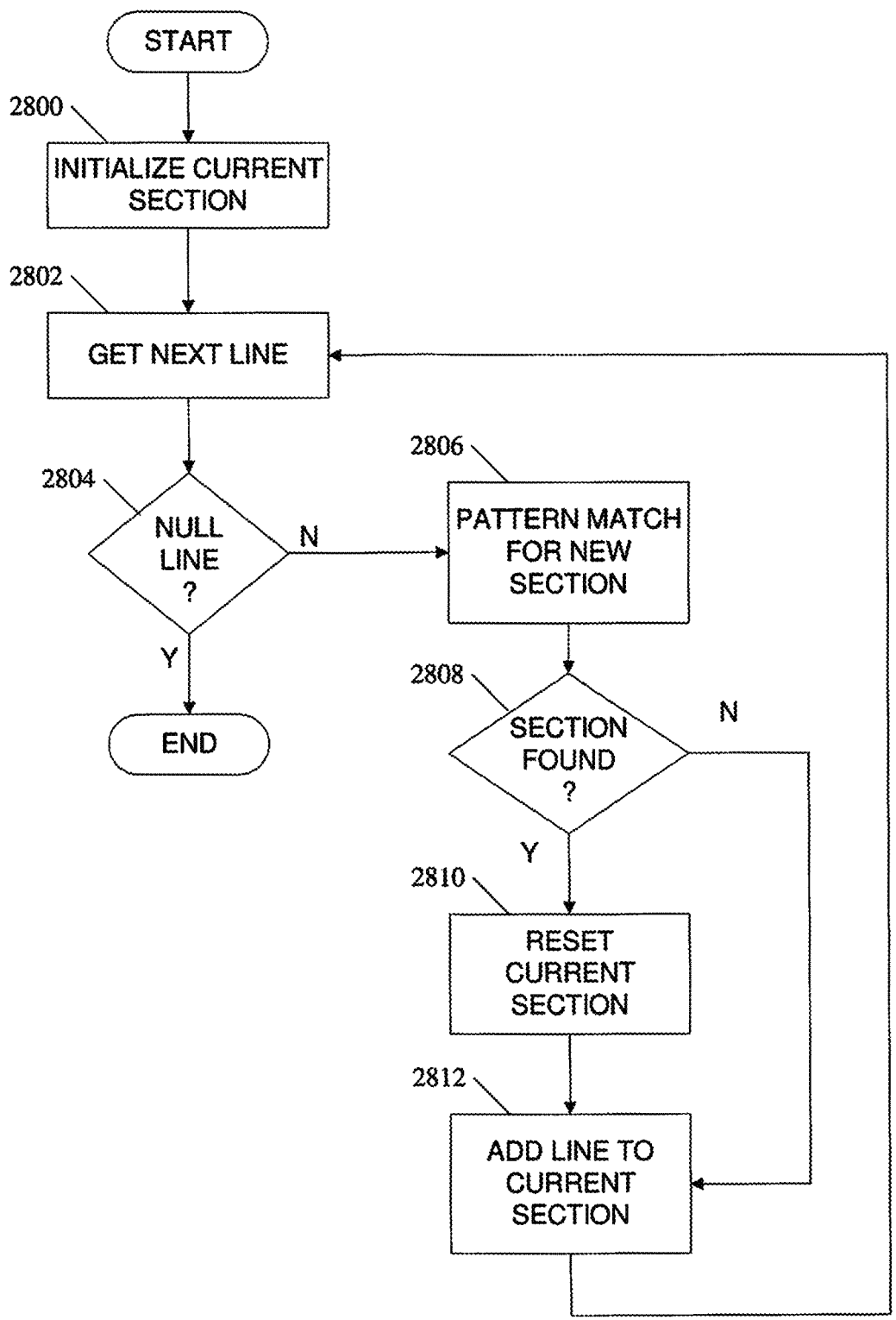
FIG. 28 illustrates an exemplary process for sectionalization according to an embodiment of the subject matter described herein.

FIG. 28 illustrates an exemplary process for sectionalization according to an embodiment of the subject matter described herein. In one embodiment, the process starts by initializing a current section (block 2800) then getting the next line (block 2802) and checking for a null line (block 2804). A null line indicates that there are no more lines so the process ends. If, at block 2804, a next line is available, the process performs a pattern match for a new section (block 2806). In one embodiment, a new section is identified by looking for patterns that are commonly used in section headings, such as "abstract", "references", and so on. The process checks to see if a section has been identified (block 2808), and if so, the current section is reset (block 2810) and the line is added (block 2812). If, at block 2808, a new section is not found, the line is added to the current section (block 2812).

FIGS. 29 through 32 illustrate an exemplary process for line processing inline references according to an embodiment of the subject matter described herein.

Figure 29:
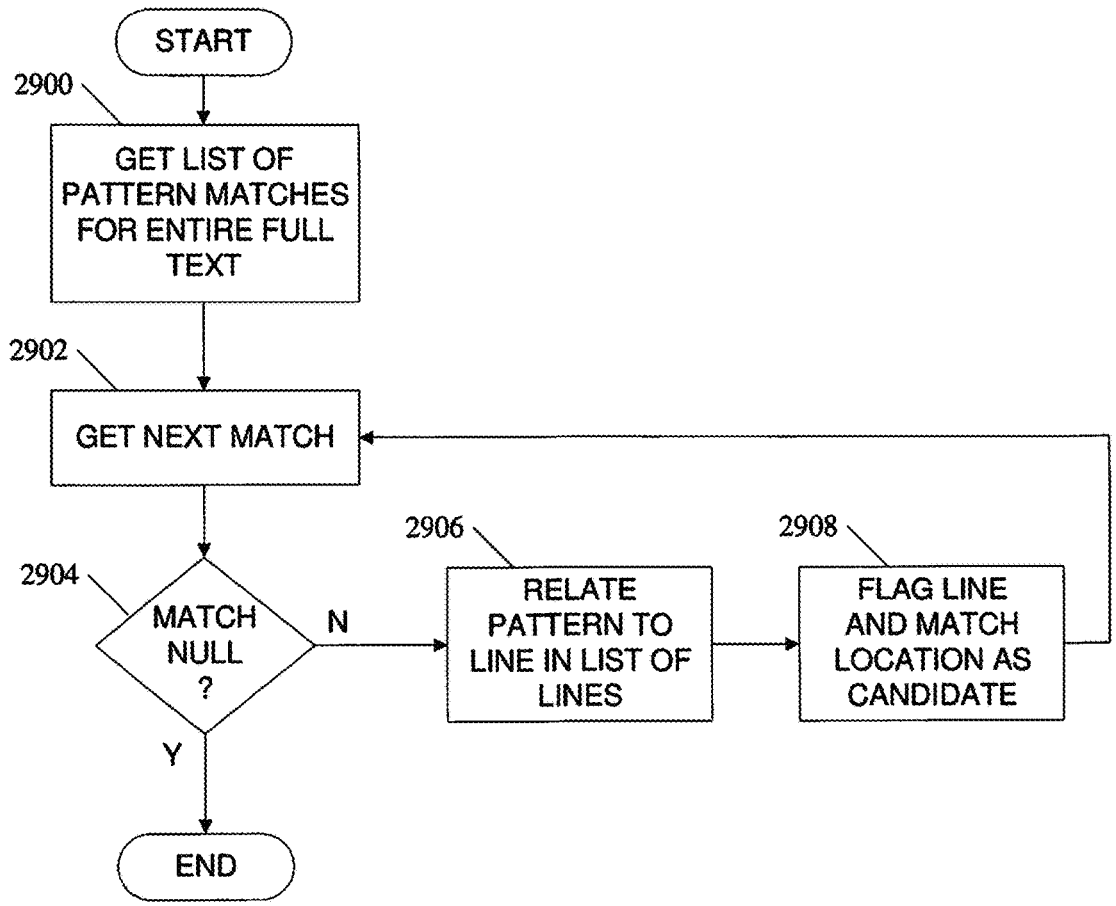
FIGS. 29 through 32 illustrate an exemplary process for line processing inline references according to an embodiment of the subject matter described herein.

FIG. 29 illustrates a process of identifying inline reference candidates according to an embodiment of the subject matter described herein. In the embodiment illustrated in FIG. 29, the process includes getting a list of pattern matches for the entire, full text (block 2900). Each match in the list is a potential inline reference. In one embodiment, this list may be all of the matches found for one pattern or all of the matches found from multiple patterns. The list of matches is processed one by one starting at block 2902. If there are no more matches (indicated by a null match at block 2904), the process ends. Each match in the list is related to the line which included the matched text (block 2906), and both the line and the location of the matched text is flagged as a candidate inline reference (block 2908).

Figure 30:
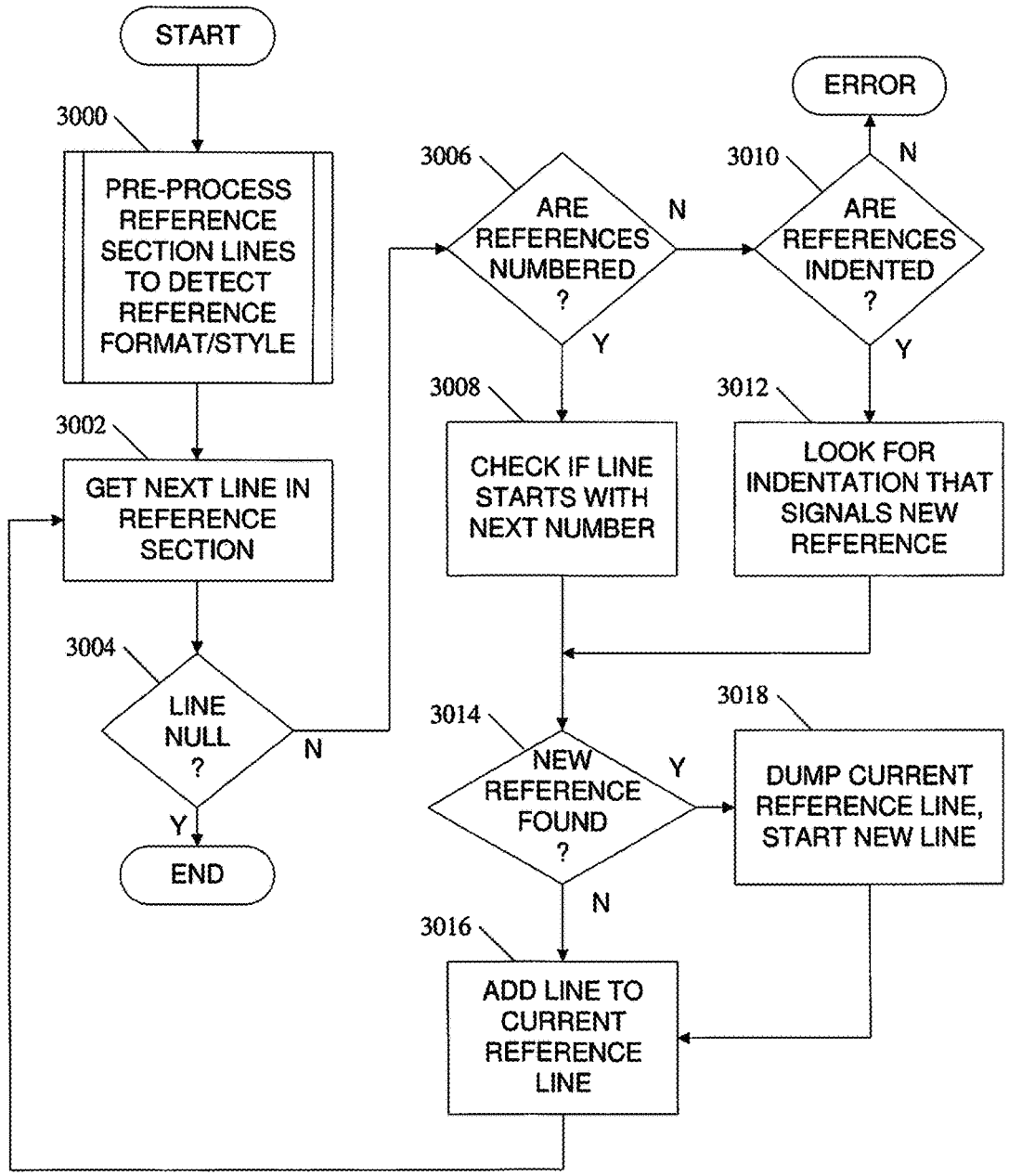

FIG. 30 illustrates a process of separating reference lines into individual references according to an embodiment of the subject matter described herein. In the embodiment illustrated in FIG. 30, the process includes pre-processing the reference section lines in an attempt to identify the format or style being used for the references (block 3000). The process then loops through the lines of the reference section, starting by getting the next line in the reference section (block 3002) and checking whether a null line was returned (block 3004), in which case the process ends. If a non-null line was returned, the process performed to separate the reference lines depends on which reference format or style was identified in block 3000. If references are numbered (block 3006), the process will check whether the line starts with the next reference number (block 3008). On the other hand, if references are indented (block 3010), the process will look for indentation or a pattern of indentation that signals a new reference (block 3012). Examples of indentation patterns include, but are not limited to, first line indents, hanging indents, and the like. If a new reference is not found (block 3014), the current line is added to the existing reference line (block 3016). If a new reference is found, at block 3018 the current reference line is dumped (e.g., stored) and a new reference line is started (block 3018), after which the line is added to the current, newly created, reference line at block 3016.

Figure 31:
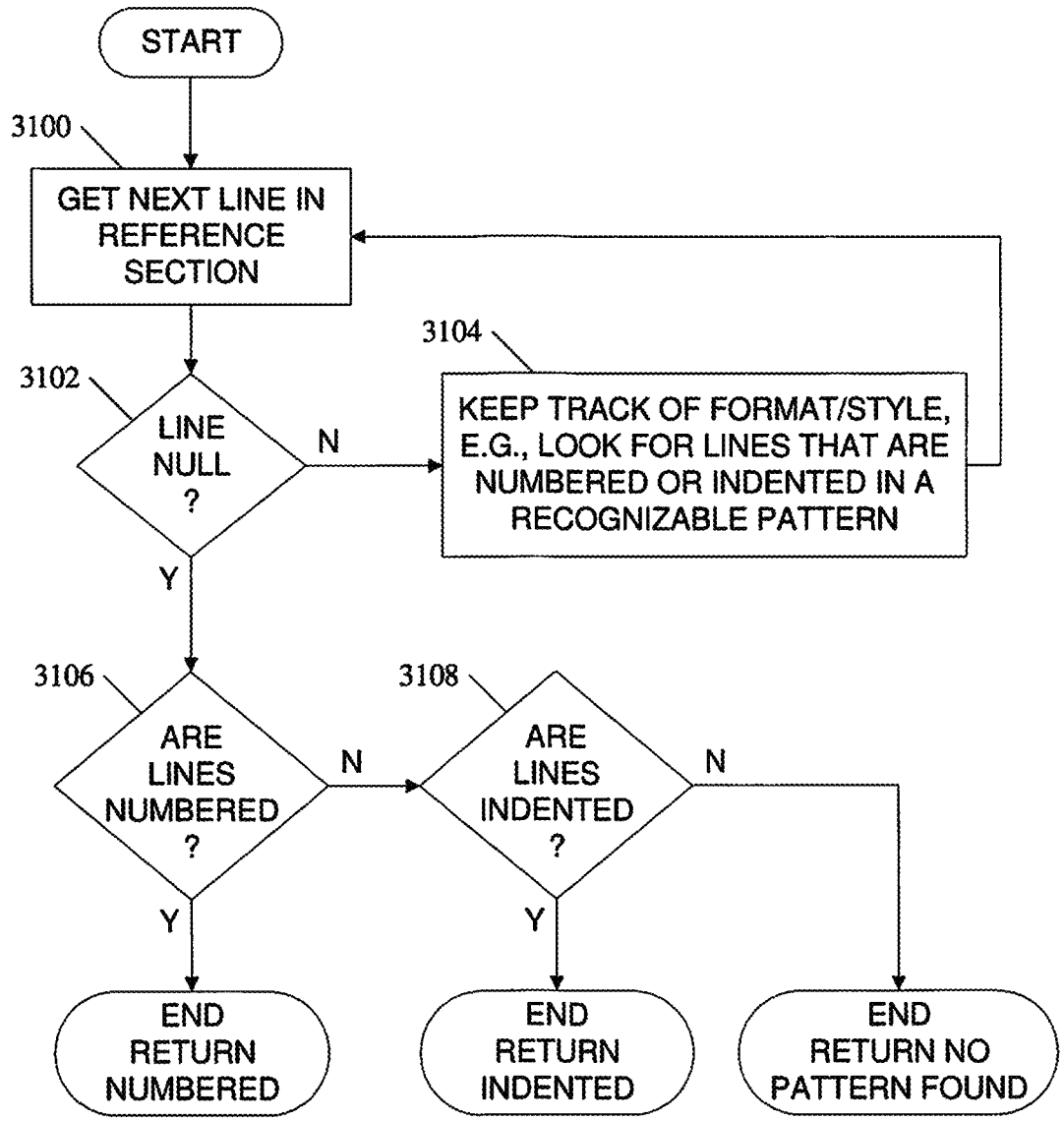

FIG. 31 illustrates the process of block 3000 in more detail. In the embodiment illustrated in FIG. 31, pre-processing lines identified as being in the "References" section includes getting the next line in the reference section (block 3100), checking whether a null line was returned (block 3102), and if not, keeping track of format/style being used (block 3104) e.g., by looking for lines that are numbered or lines that are indented in a recognizable pattern, and returning to block 3100. This continues until all lines are processed, at which time the process goes reports what it found. If numbered lines were found (block 3106), the process indicates that references are numbered. If indented lines were found (block 3108), the process reports that references are indented. If neither numbered nor indented lines were found, the process reports that no pattern was found.

Figure 32:
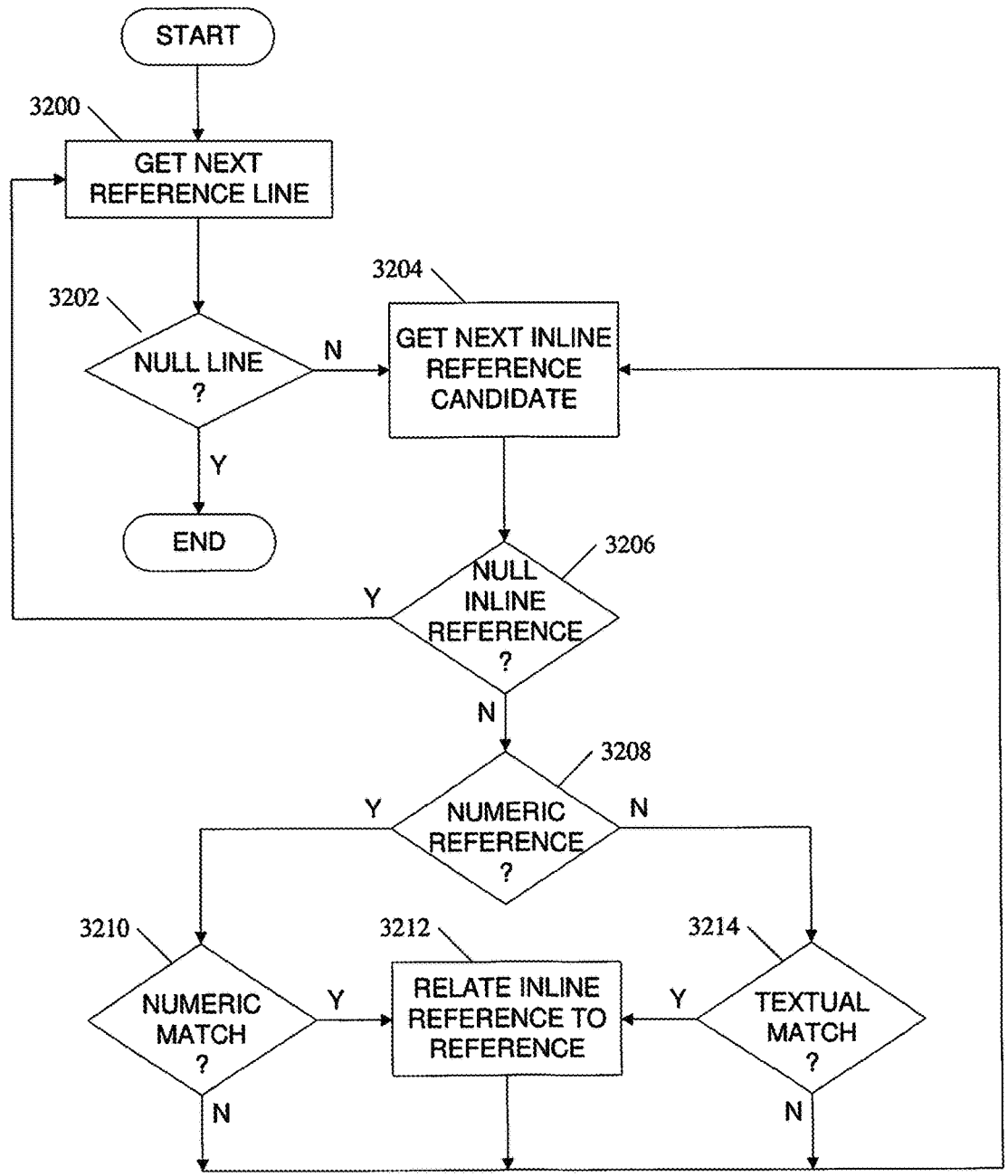

FIG. 32 illustrates the process of relating individual references to inline reference candidate s according to an embodiment of the subject matter described herein. In the embodiment illustrated in FIG. 32, the process starts by getting the next line in the References section (block 3200). If the next line is null (block 3202), this indicates that all lines in the reference section have been processed, and the process ends. Otherwise, the process loops through the inline references to see if any of them match the line from the reference section. Thus, at block 3204, the process gets the next inline reference candidate. If the next inline reference candidate is null (block 3206), the process returns to block 3200. Otherwise, the process depends on whether references are identified by number or identified by indenting pattern. This is checked for in block 3208. If the references are numeric, the process looks to see if the inline reference candidate contains a number that matches a reference number (block 3210), and if so, the inline reference candidate is related to the inline reference and the process continues at block 3206. On the other hand, if, at block 3208, the references are not numeric, the process looks to see if the inline reference candidate contains text that matches some or all of the reference text (block 3214), and if so, the inline reference candidate is related to the inline reference in block 3212 and here also the process continues at block 3206. If the inline reference candidate was not actually an inline reference, so the process also returns the block 3206.

Figure 33:
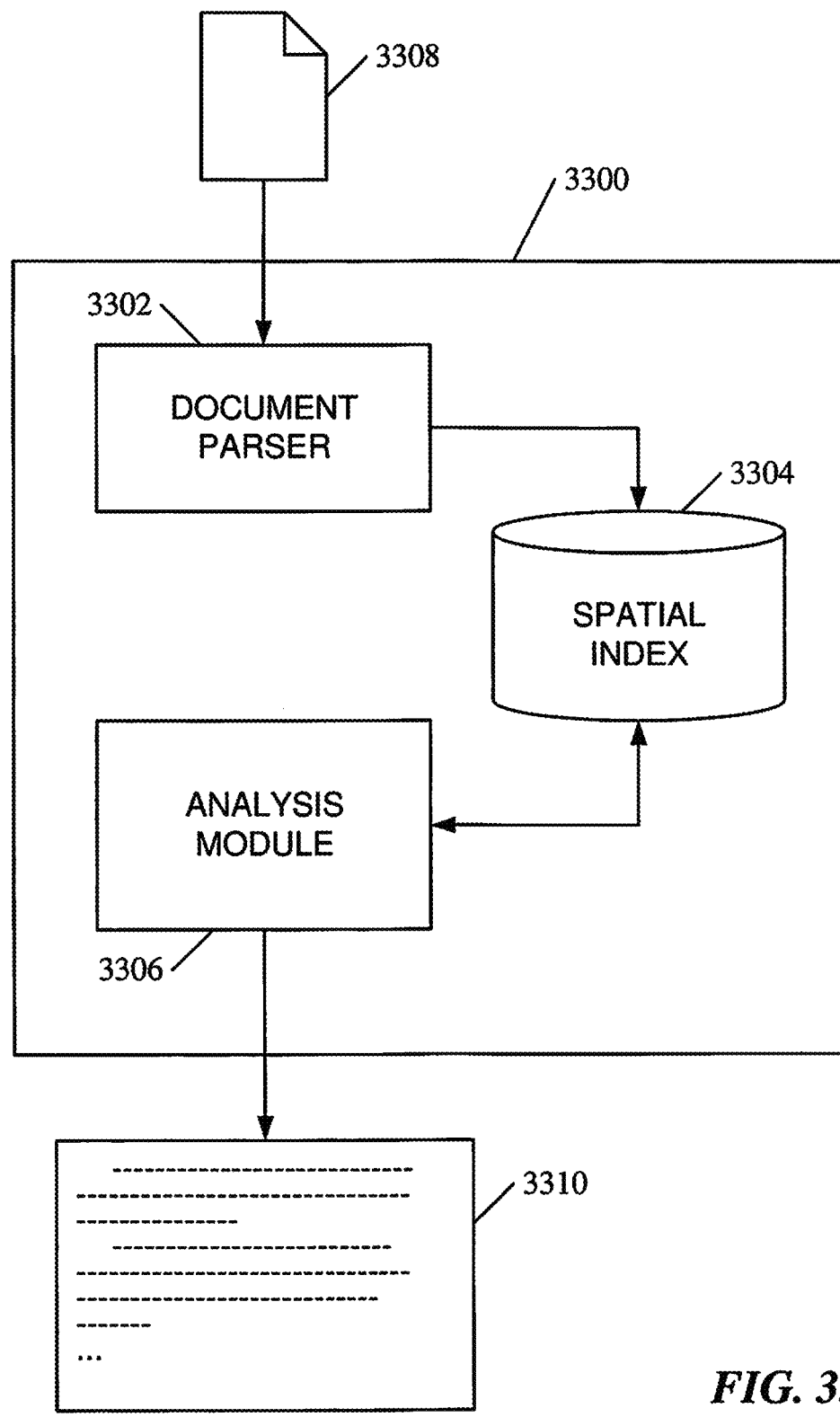
FIG. 33 is a block diagram illustrating an exemplary system for efficient and accurate text extraction from unstructured documents according to an embodiment of the subject matter described herein.

FIG. 33 is a block diagram illustrating an exemplary system for efficient and accurate text extraction from unstructured documents according to an embodiment of the subject matter described herein. In the embodiment illustrated in FIG. 33, system 3300 includes a document parser module 3302, a spatial index 3304, and an analysis module 3306. In the embodiment illustrated in FIG. 33, document parser module 3302 parses an unstructured document 3308 and, for each page within document 3308, identifies words and their locations within the page and stores the identified words and their locations into spatial index 3304. Analysis module 3306 uses the spatial index to detect the locations of columns and/or column boundaries within the page, aggregating words into lines, identifying words that are part of a header or a footer of the page, identifying lines that are part of a table or a figure within the page, and joining lines together to generate continuous text flows 3310.

It should be noted that the division of labor of the functions performed by system 3300 between document parser module 3302 and analysis module 3306 is not the only embodiment contemplated, and that in other embodiments, these functions may be performed by a single module, distributed among multiple modules that may or may not include the modules illustrated in FIG. 33, or may be divided according to some other division of labor.

Figure 34:
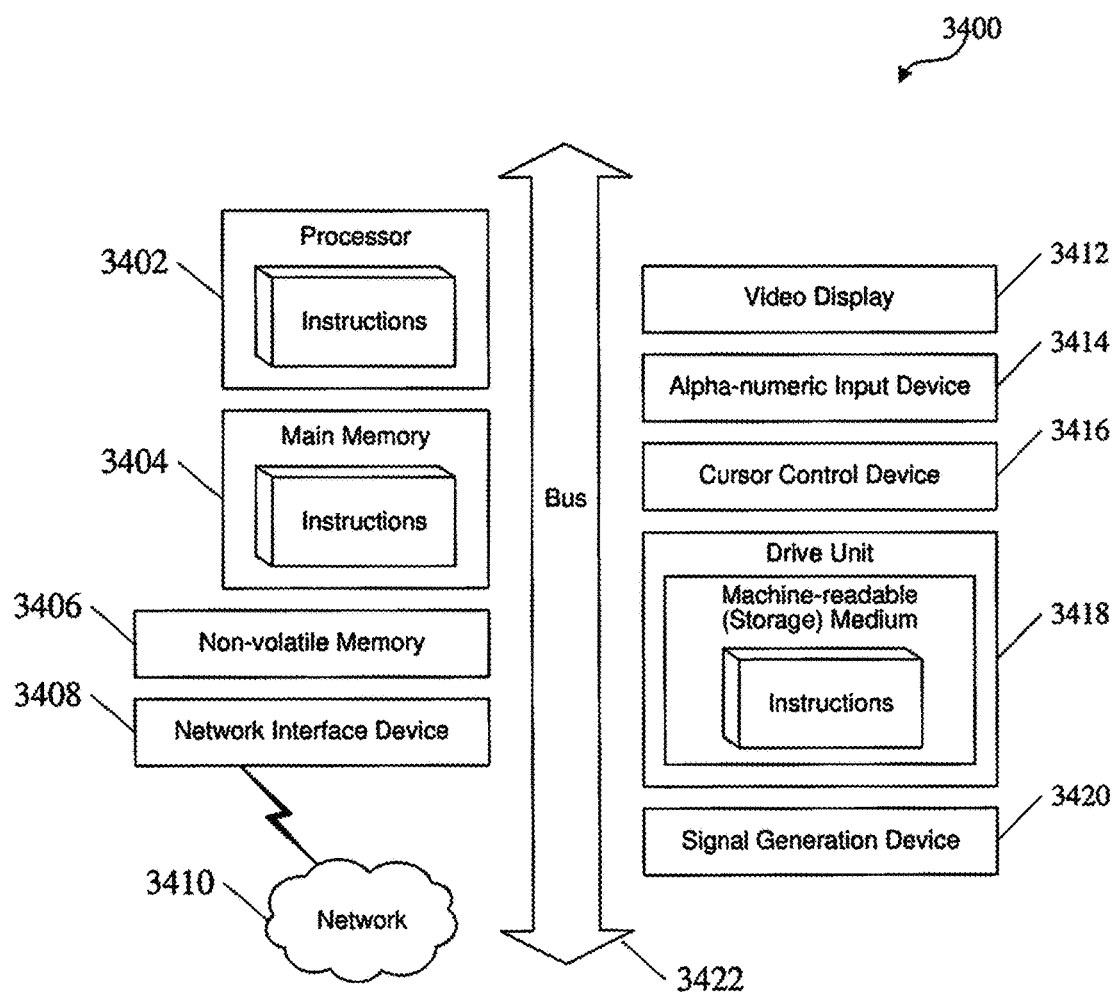
FIG. 34 shows a diagrammatic representation of a machine in the example form of a computer system within which a set of instructions, for causing the machine to perform any one or more of the methodologies discussed herein, may be executed.

FIG. 34 shows a diagrammatic representation of a machine in the example form of a computer system within which a set of instructions, for causing the machine to perform any one or more of the methodologies discussed herein, may be executed.

In the example of FIG. 34, the computer system 3400 includes a processor 3402, main memory 3404, non-volatile memory 3406, and an interface device 3408 for connecting to a network 3410. System 3400 may include a video display 3412, an alpha-numeric input device 3414, such as a keyboard or touch screen, a cursor control device 3416, such as a mouse, trackpad, touchpad, or touch screen, and a non-volatile mass data storage device 3418, such as a hard disk drive, solid state drive, etc. System 3400 may include a signal generation device 3420, such as a speaker or microphone. Memory 3404 is coupled to processor 3402 by, for example, a bus 3422. System 3400 can receive an unstructured document as input and generate a text flow as output. An interface, such as network interface device 3408 or other interface may be used for receiving the unstructured document and/or outputting the generated text flow. System 3400 may include a database for storing information for later query during execution of the methods described herein and/or for storing the generated text flow.

Various common components (e.g., cache memory) are omitted for illustrative simplicity. The computer system 3400 is intended to illustrate a hardware device on which any of the components depicted in figures or described in this specification can be implemented. The computer system 3400 can be of any applicable known or convenient type. The components of the computer system 3400 can be coupled together via a bus or through some other known or convenient device.

EMBODIMENTS

The following is a list of example embodiments of the subject matter described herein. This list is illustrative and not intended to be exclusive or limiting. Other embodiments are also within the scope of the subject matter described herein.

1. A method for extracting text from unstructured documents, the method including creating a spatial index for storing information about words on a page of a document to be analyzed, using the spatial index to detect white space that indicates boundaries of columns within the page, using the spatial index and column information to aggregate words into lines, and joining lines together to generate continuous text flows.

2. The method of embodiment 1 including using the spatial index to identify lines that are part of a header or footer of the page and/or lines that are part of a table or a figures within the page, which are excluded when joining lines together to generate continuous text flows.

3. The method of embodiment 1 wherein joining lines together to generate continuous text flows includes using a natural language processing model to identify which lines should be joined together.

4. The method of embodiment 3 wherein using a natural language processing model to identify which lines should be joined together includes determining a likelihood that joining two lines together is correct.

5. The method of embodiment 4 wherein using a natural language processing model to identify which lines should be joined together includes resolving an ambiguity about which of two possible pairs of lines should be joined by joining the pair of lines with the higher likelihood of being correct.

6. The method of embodiment 3 wherein using a natural language processing model to identify which lines should be joined together includes analyzing a sequence of words at a point of potential merger between two lines to determine whether the two lines should be merged or not.

7. The method of embodiment 1 including categorizing portions of the continuous text flows as belonging to a section.

8. The method of embodiment 7 wherein categorizing portions of the continuous text flows as belonging to a section includes identifying section boundaries.

9. The method of embodiment 8 including categorizing as belonging to a section a portion of the continuous text flow starting from the identified section boundary and ending at the next identified section boundary.

10. The method of embodiment 7 including identifying a references section and parsing the references section to identify individual reference entries.

11. The method of embodiment 10 including associating a reference entry to locations, outside of the references section, that refer to the reference entry.

12. The method of embodiment 11 wherein associating a reference entry to a location, outside of the reference section, that refers to the reference entry includes inserting at least some of the reference entry into the location, inserting, into the location, a hyperlink to the reference entry, and/or creating an index listing the locations of the inline references.

13. The method of embodiment 1 wherein creating a spatial index includes creating an R-Tree, an R+ Tree, an R* Tree, a Quad-Tree, or other spatial index implementation.

14. The method of embodiment 1 wherein using the spatial index includes querying the spatial index with query location, the query location including the coordinates of a point, a rectangle or other area, or a volume.

15. The method of embodiment 14 including receiving a query response from the spatial index, the query response identifying text objects that occupy the query location, or identifying no text objects if none occupy the query location.

16. A system for extracting text from unstructured documents, the system including a document parser module for parsing an unstructured document and, for each page within the document, identifying words and their locations within the page and storing the identified words and their locations into a spatial index. The system also includes an analysis module for using the spatial index to detect white space that indicates boundaries of columns within the page, aggregating words into lines, and joining lines together to generate continuous text flows.

17. The system of embodiment 16 wherein the analysis module uses the spatial index to identify lines that are part of a header or a footer of the page, and/or lines that are part of a table or a figure within the page, which are excluded when joining lines together to generate continuous text flows.

18. The system of embodiment 16 wherein the analysis module joins lines together to generate continuous text flows using a natural language processing model to identify which lines should be joined together.

19. The system of embodiment 18 wherein the analysis module uses a natural language processing model to identify which lines should be joined together by determining a likelihood that joining two lines together is correct.

20. The system of embodiment 19 wherein the analysis module uses a natural language processing model to identify which lines should be joined together by resolving an ambiguity about which of two possible pairs of lines should be joined by joining the pair of lines with the higher likelihood of being correct.

21. The system of embodiment 18 wherein the analysis module uses a natural language processing model to identify which lines should be joined together by analyzing a sequence of words at a point of potential merger between two lines to determine whether the two lines should be merged or not.

22. The system of embodiment 16 wherein the analysis module categorizes portions of the continuous text flows as belonging to a section.

23. The system of embodiment 22 wherein the analysis module categorizes portions of the continuous text flows as belonging to a section by identifying section boundaries.

24. The system of embodiment 23 wherein the analysis module categorizes, as belonging to an identified section, portions of the continuous text flows starting from the identified section boundary and ending at the next identified section boundary.

25. The system of embodiment 22 including identifying a references section and parsing the reference section to identify individual reference entries.

26. The system of embodiment 25 including associating a reference entry to locations, outside of the references section, that refer to the reference entry.

27. The system of embodiment 26 where associating a reference entry to a location, outside of the reference section, that refers to the reference entry includes inserting at least some of the reference entry into the location, inserting, into the location, a hyperlink to the reference entry, and/or creating an index listing the locations of the inline references.

28. The system of embodiment 16 wherein document parser creates a spatial index by creating an R-Tree, an R+ Tree, an R* Tree, a Quad-Tree, or other spatial index implementation.

29. The system of embodiment 16 wherein the analysis module uses the spatial index by querying the spatial index with a query location, the query location including the coordinates of a point, a rectangle or other area, or a volume.

30. The system of embodiment 29 wherein the analysis module receives a query response from the spatial index, the query response identifying text objects that occupy the query location, or identifying no text objects if none occupy the query location.

31. A computer program product for extracting text from unstructured documents, the computer program product including a non-transitory computer readable storage medium having computer readable code embodied therewith, the computer readable code including computer readable program code. The code is configured for creating a spatial index for storing information about words on a page of a document to be analyzed, using the spatial index to detect white space that indicates boundaries of columns within the page, using the spatial index and column information to aggregate words into lines, and joining lines together to generate continuous text flows.

What is claimed is:

1. A system for extracting text from unstructured documents, the system comprising:
a computing platform having:
a processor and memory circuits;
an interface for receiving as input an unstructured document;
a document parser module for parsing a received unstructured document and, for each page within the document, identifying words and their locations within the page and storing the identified words and their locations into a spatial index stored in the memory, the spatial index comprising a data structure having a hierarchy that is traversed during a query; and
an analysis module for using the spatial index to detect white space that indicates boundaries of columns within the page, for using the spatial index and column information for aggregating words into lines, and for joining lines together to generate continuous text flows, which are stored in the memory,
wherein the analysis module detects the white space that indicates boundaries of columns within the page by retrieving a spatial index for that page, and, starting from the top left corner of the page:
traversing X-Y coordinate points of the page in a top-to-bottom order to identify vertical columns of white space not occupied by a word, wherein the traversed X-Y coordinate points are used to query the spatial index to determine whether or not those coordinates are occupied by a word;
repeating the traversing steps in a left-to-right order, starting each traversal to the right of the previous traversal until the entire page has been processed; and
merging contiguous identified vertical columns of white space into column separators.

2. The system of claim 1 wherein the analysis module uses the spatial index to identify lines that are part of a header or a footer of the page, and/or lines that are part of a table or a figure within the page, which are excluded when joining lines together to generate continuous text flows.

3. The system of claim 1 wherein the analysis module joins lines together to generate continuous text flows using a natural language processing model to identify which lines should be joined together.

4. The system of claim 3 wherein the analysis module uses a natural language processing model to identify which lines should be joined together by determining a likelihood that joining two lines together is correct.

5. The system of claim 4 wherein the analysis module uses a natural language processing model to identify which lines should be joined together by resolving an ambiguity about which of two possible pairs of lines should be joined by joining the pair of lines with the higher likelihood of being correct.

6. The system of claim 3 wherein the analysis module uses a natural language processing model to identify which lines should be joined together by analyzing a sequence of words at a point of potential merger between two lines to determine whether the two lines should be merged or not.

7. The system of claim 1 wherein the analysis module categorizes portions of the continuous text flows as belonging to a section.

8. The system of claim 7 wherein the analysis module categorizes portions of the continuous text flows as belonging to a section by identifying section boundaries.

9. The system of claim 8 wherein the analysis module categorizes, as belonging to an identified section, portions of the continuous text flows starting from the identified section boundary and ending at the next identified section boundary.

10. The system of claim 7 wherein the analysis module identifies a references section and parses the reference section to identify individual reference entries.

11. The system of claim 10 wherein the analysis module associates a reference entry to locations, outside of the references section, that refer to the reference entry.

12. The system of claim 11 where associating a reference entry to a location, outside of the reference section, that refers to the reference entry comprises at least one of:
inserting at least some of the reference entry into the location;
inserting, into the location, a hyperlink to the reference entry; and
creating an index listing the locations of the inline references.

13. The system of claim 1 wherein document parser creates a spatial index by creating an R-Tree, an R+ Tree, an R* Tree, or a Quad-Tree.

14. The system of claim 1 wherein the analysis module uses the spatial index by querying the spatial index with a query location, the query location including the coordinates of a point, a rectangle or other area, or a volume.

15. The system of claim 14 wherein the analysis module receives a query response from the spatial index, the query response identifying text objects that occupy the query location, or identifying no text objects if none occupy the query location.

16. A method for extracting text from unstructured documents, the method comprising:
creating a spatial index for storing information about words on a page of a document to be analyzed and storing the spatial index in a database hosted on computing hardware, the spatial index comprising a data structure having a hierarchy that is traversed during a query;
using the spatial index to detect white space that indicates boundaries of columns within the page by retrieving a spatial index for that page, and, starting from the top left corner of the page:
traversing X-Y coordinate points of the page in a top-to-bottom order to identify vertical columns of white space not occupied by a word, wherein the traversed X-Y coordinate points are used to query the spatial index to determine whether or not those coordinates are occupied by a word;
repeating the traversing steps in a left-to-right order, starting each traversal to the right of the previous traversal until the entire page has been processed; and
merging contiguous identified vertical columns of white space into column separators;
using the spatial index and column information to aggregate words into lines; and
joining lines together to generate continuous text flows.

17. The method of claim 16 comprising using the spatial index to identify lines that are part of a header or footer of the page and/or lines that are part of a table or a figures within the page, which are excluded when joining lines together to generate continuous text flows.

18. The method of claim 16 wherein joining lines together to generate continuous text flows includes using a natural language processing model to identify which lines should be joined together.

19. The method of claim 16 comprising categorizing portions of the continuous text flows as belonging to a section.

20. The method of claim 19 comprising identifying a references section and parsing the references section to identify individual reference entries.

21. The method of claim 20 comprising associating a reference entry to locations, outside of the references section, that refer to the reference entry.

22. The method of claim 21 wherein associating a reference entry to a location, outside of the reference section, that refers to the reference entry comprises at least one of:
   inserting at least some of the reference entry into the location;
   inserting, into the location, a hyperlink to the reference entry; and
   creating an index listing the locations of the inline references.

23. The method of claim 16 wherein using the spatial index comprises querying the spatial index with query location, the query location including the coordinates of a point, a rectangle or other area, or a volume.

24. The method of claim 23 comprising receiving a query response from the spatial index, the query response identifying text objects that occupy the query location, or identifying no text objects if none occupy the query location.

25. A computer program product for extracting text from unstructured documents, the computer program product comprising:
   a non-transitory computer readable storage medium having computer readable code embodied therewith, the computer readable code comprising:
   computer readable program code configured for:
      creating a spatial index for storing information about words on a page of a document to be analyzed, the spatial index comprising a data structure having a hierarchy that is traversed during a query;
      using the spatial index to detect white space that indicates boundaries of columns within the page by retrieving a spatial index for that page, and, starting from the top left corner of the page:
         traversing X-Y coordinate points of the page in a top-to-bottom order to identify vertical columns of white space not occupied by a word, wherein the traversed X-Y coordinate points are used to query the spatial index to determine whether or not those coordinates are occupied by a word;
         repeating the traversing steps in a left-to-right order, starting each traversal to the right of the previous traversal until the entire page has been processed; and
         merging contiguous identified vertical columns of white space into column separators;
      using the spatial index and column information to aggregate words into lines; and
      joining lines together to generate continuous text flows.

* * * * *